United States Patent
Bossen et al.

(10) Patent No.: US 12,126,814 B2
(45) Date of Patent: Oct. 22, 2024

(54) SYSTEMS AND METHODS FOR PERFORMING INTRA PREDICTION CODING

(71) Applicant: SHARP KABUSHIKI KAISHA, Sakai (JP)

(72) Inventors: Frank Bossen, Vancouver, WA (US); Kiran Mukesh Misra, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 352 days.

(21) Appl. No.: 17/420,139

(22) PCT Filed: Dec. 26, 2019

(86) PCT No.: PCT/JP2019/051076
§ 371 (c)(1),
(2) Date: Jun. 30, 2021

(87) PCT Pub. No.: WO2020/141598
PCT Pub. Date: Jul. 9, 2020

(65) Prior Publication Data
US 2022/0086460 A1 Mar. 17, 2022

Related U.S. Application Data

(60) Provisional application No. 62/787,584, filed on Jan. 2, 2019, provisional application No. 62/787,733, filed (Continued)

(51) Int. Cl.
*H04N 19/82* (2014.01)
*H04N 19/119* (2014.01)
(Continued)

(52) U.S. Cl.
CPC ......... *H04N 19/159* (2014.11); *H04N 19/119* (2014.11); *H04N 19/176* (2014.11); *H04N 19/70* (2014.11)

(58) Field of Classification Search
CPC .... H04N 19/593; H04N 19/70; H04N 19/159; H04N 19/119; H04N 19/176; H04N 19/82
See application file for complete search history.

(56) References Cited

U.S. PATENT DOCUMENTS

2016/0227214 A1* 8/2016 Rapaka ............... H04N 19/186
2016/0353104 A1* 12/2016 Song ................... H04N 19/119

FOREIGN PATENT DOCUMENTS

WO WO-2017191782 A1 * 11/2017 ............ H04N 19/12

OTHER PUBLICATIONS

Benjamin Bross et al., Versatile Video Coding (Draft 4), JVET-M1001-v3 Joint Video Experts Team (JVET) of ITU-T SG 16 WP 3 and ISO/IEC JTC 1/SC 29/WG 11 13th Meeting: Marrakech, MA, Jan. 9-18, 2019.
(Continued)

*Primary Examiner* — Patrick E Demosky
(74) *Attorney, Agent, or Firm* — ScienBiziP, P.C.

(57) ABSTRACT

This disclosure relates to video coding and more particularly to techniques for intra prediction coding. In one example, a method of decoding video data is disclosed. The method comprises: parsing a value of a flag indicating whether an intra prediction mode used for generating a prediction for a current video block is a planar mode, wherein the value for the flag is encoded using a context value selected from a set of contexts; and determining whether the intra prediction mode used for generating the prediction for the current video block is the planar mode based on the parsed value of the flag.

3 Claims, 9 Drawing Sheets

Related U.S. Application Data on Jan. 2, 2019, provisional application No. 62/809,622, filed on Feb. 23, 2019, provisional application No. 62/809,701, filed on Feb. 24, 2019, provisional application No. 62/815,987, filed on Mar. 8, 2019, provisional application No. 62/820,735, filed on Mar. 19, 2019.

(51) Int. Cl.
*H04N 19/159* (2014.01)
*H04N 19/176* (2014.01)
*H04N 19/70* (2014.01)

(56) References Cited

OTHER PUBLICATIONS

Benjamin Bross et al., Versatile Video Coding (Draft 3), JVET-L1001-v7 Joint Video Experts Team (JVET) of ITU-T SG 16 WP 3 and ISO/IEC JTC 1/SC 29/WG 11 12th Meeting: Macao, CN, Oct. 3-12, 2018.

Benjamin Bross et al., Versatile Video Coding (Draft 2), JVET-K1001-v7 Joint Video Experts Team (JVET) of ITU-T SG 16 WP 3 and ISO/IEC JTC 1/SC 29/WG 11 11th Meeting: Ljubljana, SI, Jul. 10-18, 2018.

Benjamin Bross, Versatile Video Coding (Draft 1), JVET-J1001-v2 Joint Video Experts Team (JVET) of ITU-T SG 16 WP 3 and ISO/IEC JTC 1/SC 29/WG 11 10th Meeting: San Diego, US, Apr. 10-20, 2018.

Jianle Chen et al., Algorithm Description of Joint Exploration Test Model 7 (JEM 7), JVET-G1001-v1 Joint Video Exploration Team (JVET) of ITU-T SG 16 WP 3 and ISO/IEC JTC 1/SC 29/WG 11 7th Meeting: Torino, IT, Jul. 13-21, 2017.

ITU-T H.265 (Dec. 2016), High efficiency video coding.

ITU-T H.264 (Apr. 2017), Advanced video coding for generic audiovisual services.

Jie Yao et al., Non-CE3: Intra prediction information coding, JVET-M0210_v3 Joint Video Experts Team (JVET) of ITU-T SG 16 WP 3 and ISO/IEC JTC 1/SC 29/WG 11 13th Meeting: Marrakech, MA, Jan. 9-18, 2019.

F. Bossen, Non-CE3: a unified luma intra mode list construction process, JVET-M0528, Jan. 3, 2019.

E. Francois et al, Non-CE6c: Adaptations of Intra mode coding, JCTVC-H0175-r2 Joint Collaborative Team on Video Coding (JCT-VC) of ITU-T SG16 WP3 and ISO/IEC JTC1/SC29/WG11 8th Meeting: San Jose, US, Feb. 1-10, 2012.

* cited by examiner

SYSTEMS AND METHODS FOR PERFORMING INTRA PREDICTION CODING

CROSS REFERENCE

This Nonprovisional application claims priority under 35 U.S.C. § 119 on provisional Application No. 62/787,584 on Jan. 2, 2019, No. 62/787,733 on Jan. 2, 2019, No. 62/809,622 on Feb. 23, 2019, No. 62/809,701 on Feb. 24, 2019, No. 62/815,987 on Mar. 8, 2019, No. 62/820,735 on Mar. 19, 2019, the entire contents of which are hereby incorporated by reference.

TECHNICAL FIELD

This disclosure relates to video coding and more particularly to techniques for intra prediction coding.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the 10$^{th}$ Meeting of ISO/IEC JTC1/SC29/WG11 16-20 Apr. 2018, San Diego, CA As a result of the multiple descriptions of video coding, a draft text of a video coding specification is described in "Versatile Video Coding (Draft 1)," 10$^{th}$ Meeting of ISO/IEC JTC1/SC29/WG11 16-20 Apr. 2018, San Diego, CA, document JVET-J1001-v2, which is incorporated by reference herein, and referred to as JVET-J1001. "Versatile Video Coding (Draft 2)," 11th Meeting of ISO/IEC JTC1/SC29/WG11 10-18 Jul. 2018, Ljubljana, SI, document JVET-K1001-v7, which is incorporated by reference herein, and referred to as JVETK1001, is an update to JVET-J1001. Further, "Versatile Video Coding (Draft 3)," 12th Meeting of ISO/IEC JTC1/SC29/WG11 3-12 Oct. 2018, Macao, CN, document JVET-L1001-v7, which is incorporated by reference herein, and referred to as JVETL1001, is an update to JVET-K1001. Further, "Versatile Video Coding (Draft 4)," 13th Meeting of ISO/IEC JTC1/SC29/WG11 9-18 Jan. 2019, Marrakech, MA, document JVET-M1001-v3, which is incorporated by reference herein, and referred to as JVET-M1001, is an update to JVET-L1001.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (e.g., groups of frames within a video sequence, a frame within a group of frames, regions within a frame, video blocks within a region, and sub-blocks within a video block). Intra prediction coding techniques and inter prediction coding techniques may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In one example, a method of decoding video data, the method comprising: parsing a value of a flag indicating whether an intra prediction mode used for generating a prediction for a current video block is a planar mode, wherein the value for the flag is encoded using a context value selected from a set of contexts; and determining whether the intra prediction mode used for generating the prediction for the current video block is the planar mode based on the parsed value of the flag.

In one example, a method of encoding video data, the method comprising: determining an intra prediction mode used for generating a prediction for a current video block is a planar mode; and signaling a value of a flag indicating the intra prediction mode used for generating the prediction for a current video block is the planar mode, wherein the value of the flag in encoded using a context value selected from a set of contexts.

In one example, a device of decoding video data, the device comprising one or more processors configured to: parse a value of a flag indicating whether an intra prediction mode used for generating a prediction for a current video block is a planar mode, wherein the value for the flag is encoded using a context value selected from a set of contexts; and determine whether the intra prediction mode used for generating the prediction for the current video block is the planar mode based on the parsed value of the flag.

In one example, a device of encoding video data, the device comprising one or more processors configured to: determine an intra prediction mode used for generating a prediction for a current video block is a planar mode; and signal a value of a flag indicating the intra prediction mode used for generating the prediction for a current video block is the planar mode, wherein the value of the flag in encoded using a context value selected from a set of contexts.

DESCRIPTION OF EMBODIMENTS

Figure 1:
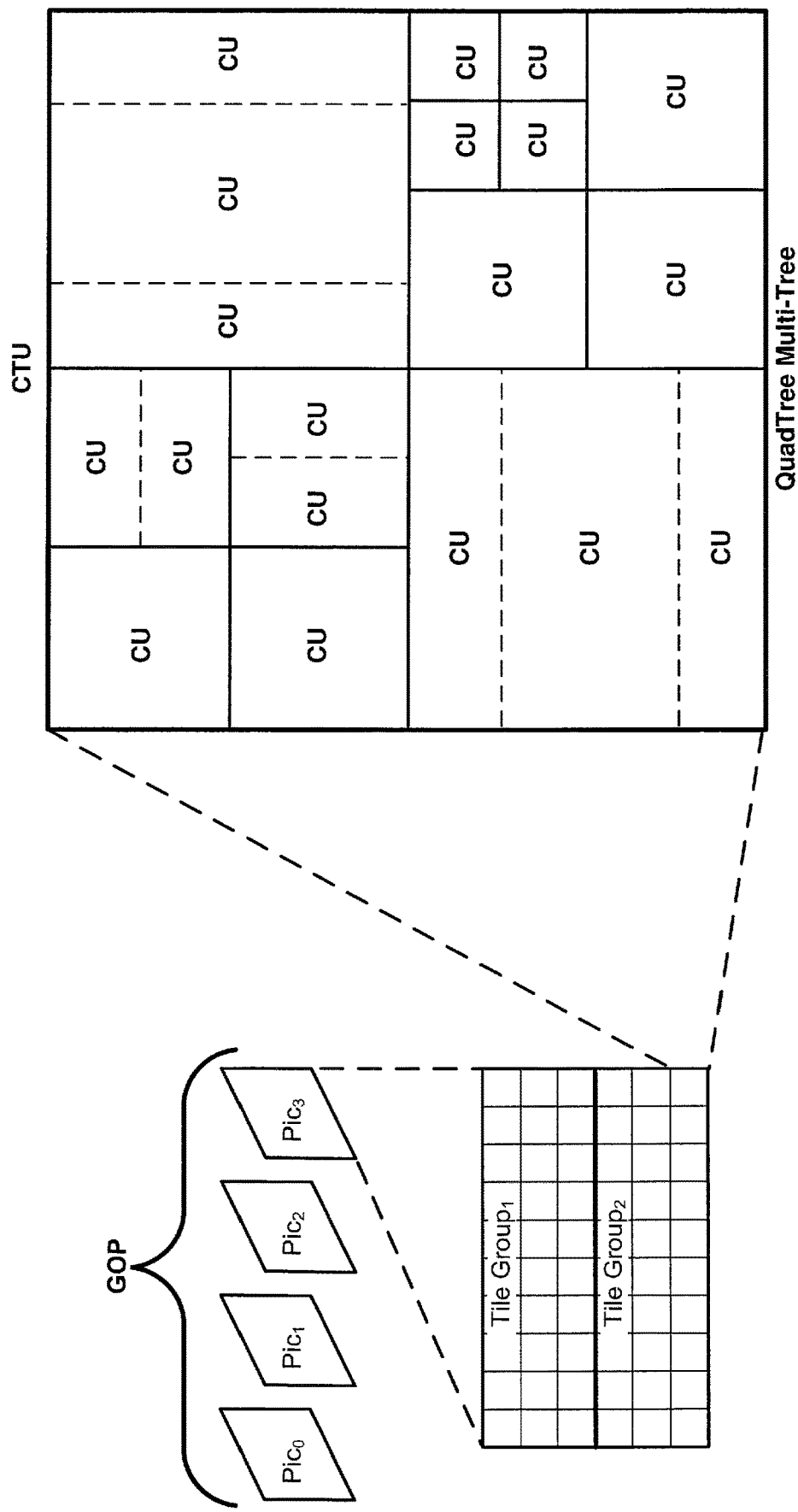
FIG. 1 is a conceptual diagram illustrating an example of a group of pictures coded according to a quad tree multi tree partitioning in accordance with one or more techniques of this disclosure.

In general, this disclosure describes various techniques for coding video data. In particular, this disclosure describes techniques for intra prediction in video coding. In particular, this disclosure describes techniques for generating a lists of most probable modes for intra prediction. Generating a lists of most probable modes for intra prediction according to the techniques described herein may be particularly useful for simplifying and harmonizing intra prediction techniques, which improve video coder performance. It should be noted that although techniques of this disclosure are described with respect to ITU-T H.264, ITU-T H.265, JVET-J1001, JVET-K1001, and JVET-L1001 the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264, ITU-T H.265, JVET-J1001, JVET-K1001, and JVET-L1001 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of encoding video data comprises determining an intra prediction mode used for generating a prediction for a current video block, signaling a first flag indicating whether the intra prediction mode is an angular intra prediction mode, and conditionally signaling a second flag indicating whether the intra prediction mode is a DC mode or a planar mode, when the first flag indicates that the intra prediction mode is not an angular intra prediction mode.

In one example, a device for video coding comprises one or more processors configured to determine an intra prediction mode used for generating a prediction for a current video block, signal a first flag indicating whether the intra prediction mode is an angular intra prediction mode, and conditionally signal a second flag indicating whether the intra prediction mode is a DC mode or a planar mode, when the first flag indicates that the intra prediction mode is not an angular intra prediction mode.

In one example, a non-transitory computer-readable storage medium comprises instructions stored thereon that, when executed, cause one or more processors of a device to determine an intra prediction mode used for generating a prediction for a current video block, signal a first flag indicating whether the intra prediction mode is an angular intra prediction mode, and conditionally signal a second flag indicating whether the intra prediction mode is a DC mode or a planar mode, when the first flag indicates that the intra prediction mode is not an angular intra prediction mode.

In one example, an apparatus comprises means for determining an intra prediction mode used for generating a prediction for a current video block, means for signaling a first flag indicating whether the intra prediction mode is an angular intra prediction mode, and means for conditionally signaling a second flag indicating whether the intra prediction mode is a DC mode or a planar mode, when the first flag indicates that the intra prediction mode is not an angular intra prediction mode.

In one example, a method of decoding video data comprises parsing a first flag indicating whether an intra prediction mode used for generating a prediction for a current video block is an angular intra prediction mode, and conditionally parsing a second flag indicating whether the intra prediction mode is a DC mode or a planar mode, when the first flag indicates that the intra prediction mode is not an angular intra prediction mode.

In one example, a device for video coding comprises one or more processors configured to parse a first flag indicating whether an intra prediction mode used for generating a prediction for a current video block is an angular intra prediction mode, and conditionally parse a second flag indicating whether the intra prediction mode is a DC mode or a planar mode, when the first flag indicates that the intra prediction mode is not an angular intra prediction mode.

In one example, a non-transitory computer-readable storage medium comprises instructions stored thereon that, when executed, cause one or more processors of a device to parse a first flag indicating whether an intra prediction mode used for generating a prediction for a current video block is an angular intra prediction mode, and conditionally parse a second flag indicating whether the intra prediction mode is a DC mode or a planar mode, when the first flag indicates that the intra prediction mode is not an angular intra prediction mode.

In one example, an apparatus comprises means for parsing a first flag indicating whether an intra prediction mode used for generating a prediction for a current video block is an angular intra prediction mode, and means for conditionally parsing a second flag indicating whether the intra prediction mode is a DC mode or a planar mode, when the first flag indicates that the intra prediction mode is not an angular intra prediction mode.

The details of one or more examples are set forth in the accompanying drawings and the description below. Other features, objects, and advantages will be apparent from the description and drawings, and from the claims.

Figure 3:
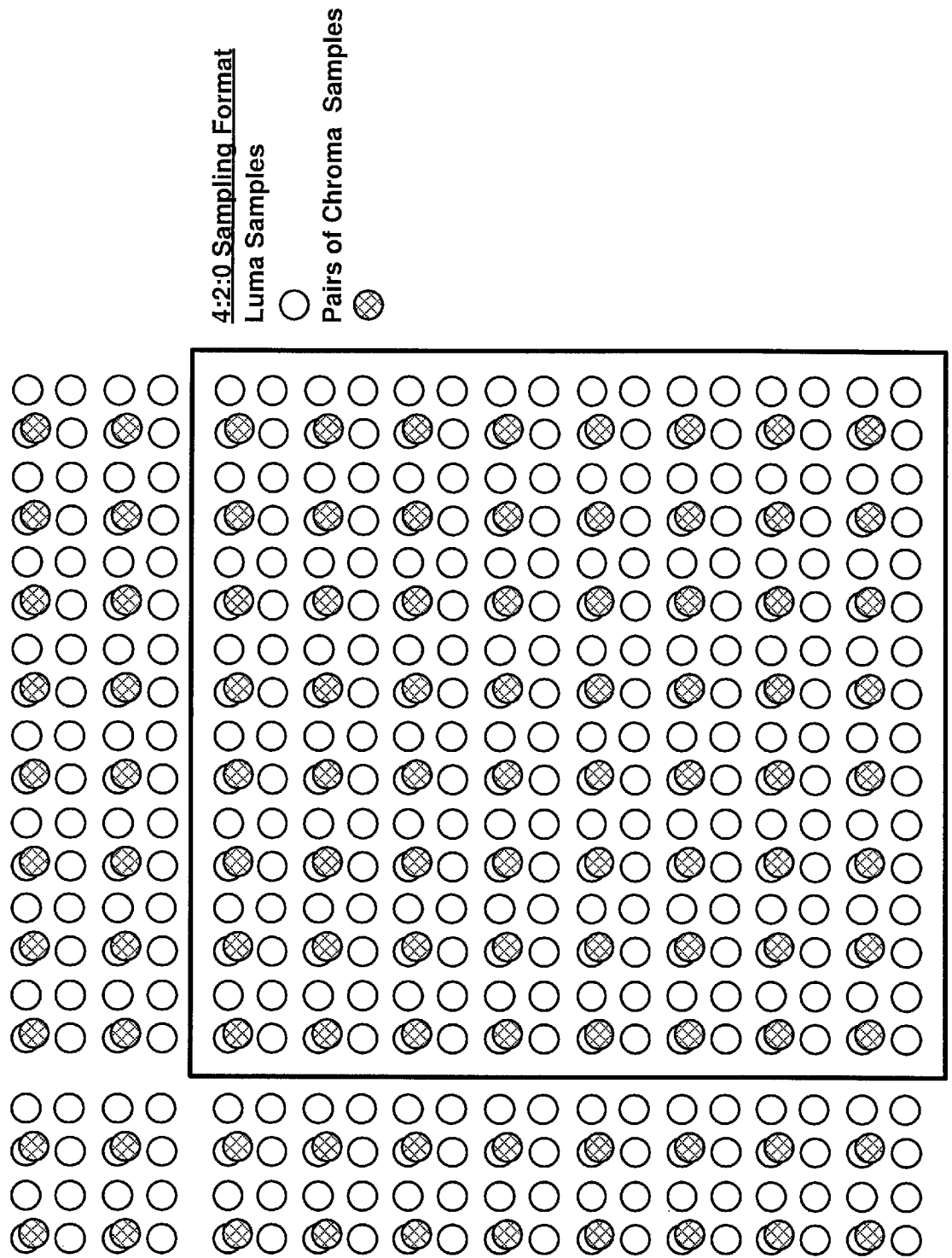
FIG. 3 is a conceptual diagram illustrating an example of a video component sampling format that may be utilized in accordance with one or more techniques of this disclosure.

Video content typically includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region (e.g., a region must be an integer number of video blocks arranged in a rectangle). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a video block formatted according to the 4:2:0 format, the width and height of an array of samples for the luma component are twice that of each array of samples for the chroma components. FIG. 3 is a conceptual diagram illustrating an example of a 16×16 coding unit formatted according to a 4:2:0 sample format. FIG. 3 illustrates the relative position of chroma samples with respect to luma samples within a video block. As described above, a video block is typically defined according to the number of horizontal and vertical luma samples. Thus, as illustrated in FIG. 3, a 16×16 video block formatted according to the 4:2:0 sample format includes 16×16 samples of luma components and 8×8 samples for each chroma component. Further, the relative position of chroma samples with respect to luma samples for video blocks neighboring the 16×16 video block are illustrated in FIG. 3. For a video block formatted according to the 4:2:2 format, the width of an array of samples for the luma component is twice that of the width of an array of samples for each chroma component, but the height of the array of samples for the luma component is equal to the height of an array of samples for each chroma component. Further, for a video block formatted according to the 4:4:4 format, an array of samples for the luma component has the same width and height as an array of samples for each chroma component.

Video blocks may be ordered within a picture and/or a region according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (also referred to as an largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any) within the same access unit. A slice segment, like a slice, is a sequence of CTUs. Thus, in some cases, the terms slice and slice segment may be used interchangeably to indicate a sequence of CTUs.

Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice. With respect to JVET-L1001, it has been proposed that slices shall be required to consist of an integer number of complete tiles instead of only being required to consist of an integer number of complete CTUs. As such, a slice including a set of CTUs which do not form a rectangular region of a picture may or may not be supported in some video coding techniques. Further, a slice that is required to consist of an integer number of complete tiles is referred to as a tile group. The techniques described herein may applicable to slices, tiles, and/or tile groups. FIG. 1 is a conceptual diagram illustrating an example of a group of pictures including tile groups. In the example illustrated in FIG. 1, $Pic_3$ is illustrated as including two tile groups (i.e., Tile $Group_1$ and Tile $Group_2$). It should be noted that in some cases, Tile $Group_1$ and Tile $Group_2$ may be classified as slices and/or tiles.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-L1001, CTUs are partitioned according a quadtree plus multi-type tree (QTMT) structure. The QTMT in JVET-L1001 is similar to the QTBT in JEM. However, in JVET-L1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

Intra prediction or inter prediction techniques are used to produce reference sample values for a current video block. The difference between sample values included in a prediction generated from the reference sample values and the current video block may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-L1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients. Quantization essentially scales transform coefficients in order to vary the amount of data required to represent a group of transform coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

Figure 2A:
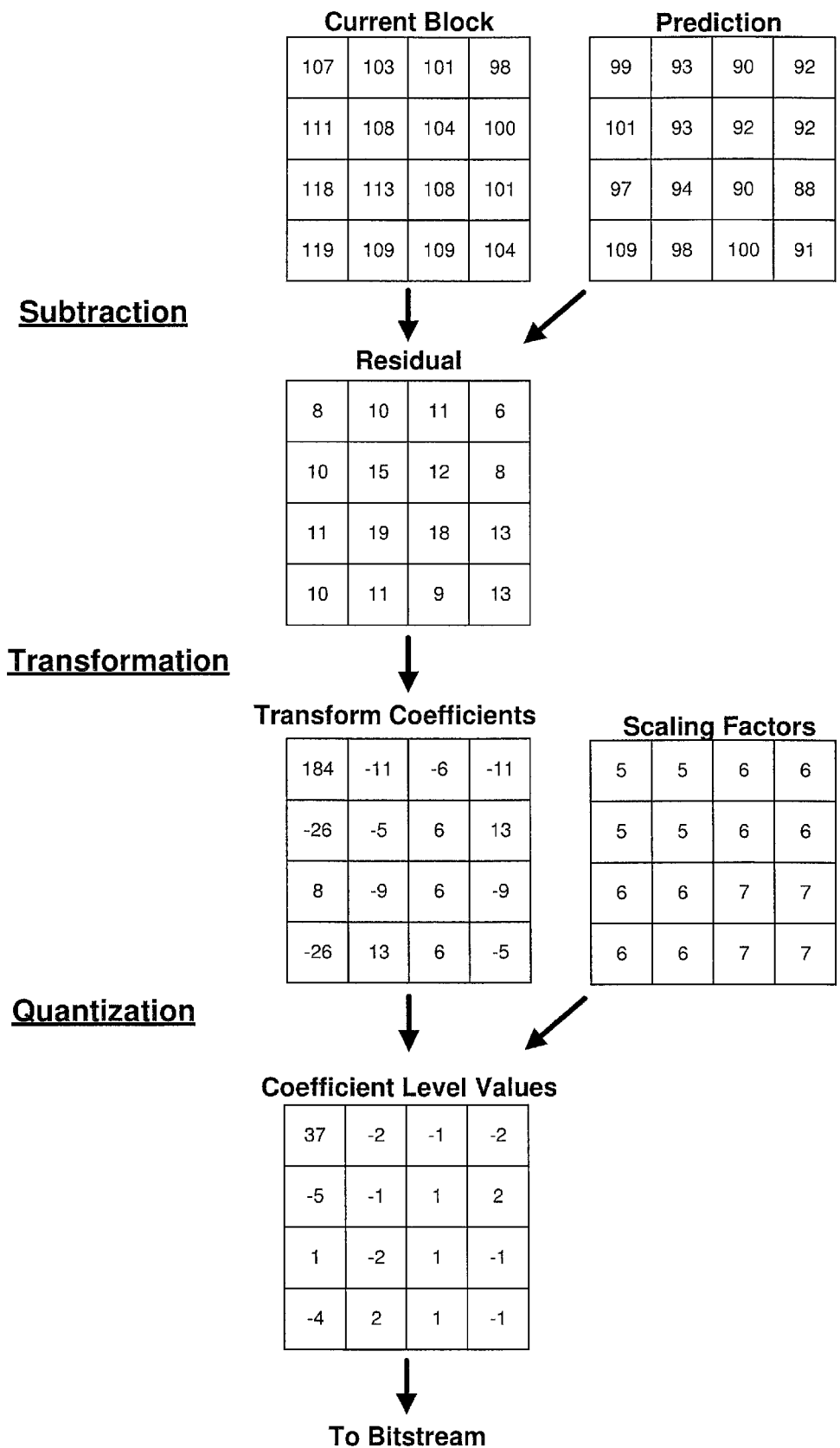
FIG. 2A is a conceptual diagram illustrating example of coding a block of video data in accordance with one or more techniques of this disclosure.
Figure 2B:
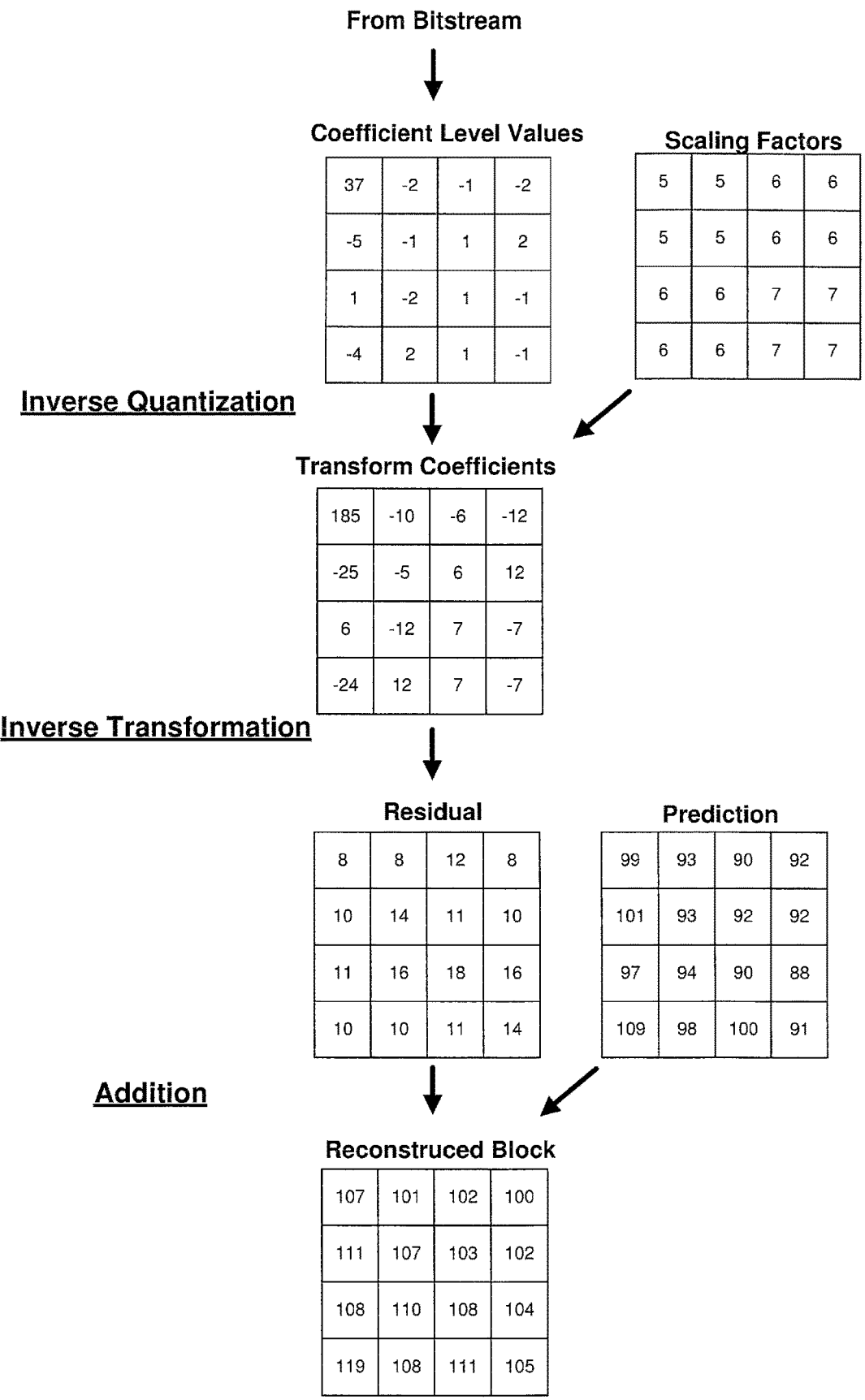
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy. However, the difference in sample values may be considered acceptable or imperceptible to a viewer of the reconstructed video. Further, as illustrated in FIGS. 2A-2B, scaling is performed using an array of scaling factors.

As illustrated in FIG. 2A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265.

An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that a CABAC entropy encoder may be implemented, such that some syntax elements may be entropy encoded using arithmetic encoding without the usage of an explicitly assigned context model, such coding may be referred to as bypass coding.

With respect to the equations used herein, the following arithmetic operators may be used:

+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.
$\Sigma_{i=x}^{y} f(i)$ The summation of f(i) with i taking all integer values from x up to and including y.
x % y Modulus. Remainder of x divided by y, defined only for integers x and y with x>=0 and y>0.

Further, the following mathematical functions may be used:

$$Abs(x) = \begin{cases} x; & x >= 0 \\ -x; & x < 0 \end{cases}$$

$$Clip3(x, y, z) = \begin{cases} x; & z < x \\ y; & z > y \\ z; & \text{otherwise} \end{cases}$$

$Clip1c(x) = Clip3(0, (1 << BitDepth_c) - 1, x)$

Floor (x) the largest integer less than or equal to x.

Round (x) = Sign (x)*Floor (Abs(x) + 0.5)

$$Sign(x) = \begin{cases} 1; & x > 0 \\ 0; & x == 0 \\ -1; & x < 0 \end{cases}$$

Further, the following logical operators may be used:
x && y Boolean logical "and" of x and y
x||y Boolean logical "or" of x and y
! Boolean logical "not"
x? y:z If x is TRUE or not equal to 0, evaluates to the value of y; otherwise, evaluates to the value of z.

Further, the following relational operators may be used:
> Greater than
>= Greater than or equal to
< Less than
<= Less than or equal to
== Equal to
!= Not equal to Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

As described above, intra prediction data or inter prediction data indicate how a prediction is generating for a current video block. For intra prediction coding, an intra prediction mode may specify the location of reference samples within a picture used for generating a prediction. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JVET-L1001, defined possible intra-prediction modes for luma include a planar prediction mode (predMode: 0), a DC prediction mode (predMode: 1), and 65 angular prediction modes (predMode: 2-66). It should be noted that JVETL1001 provides cross component prediction modes for chroma. It should be noted that planar and DC prediction modes may be referred to as non-directional prediction modes and that angular prediction modes may be referred to as directional prediction modes. Further, there may be various ways in which intra prediction modes for the chroma components may be derived based on the intra prediction mode for the luma component. It should be noted that the techniques described herein may be generally applicable regardless of the number of defined possible prediction modes. An intra-prediction mode for a current video block may be signaled, in one example, by using a so-called most probable mode (MPM). Typically, in MPM signaling, an intra-prediction mode is signaled as follows: a MPM list is created (e.g., by inheriting intra-prediction modes of neighboring video blocks); an indication is provided (e.g., a flag) as to whether the intra-prediction of the current video block is a mode in the MPM list; and if the current intra mode is in the MPM list, then an index may be signaled indicating the position of the corresponding entry in the MPM list; or if the current intra mode is not in the MPM list, then syntax element(s) are signaled indicating the intramode prediction mode (which is a mode that is not in the MPM list).

It should be noted that in some cases, only a subset of the defined possible intra-prediction modes may be available for generating a prediction for a current block. For example, referring to FIG. 3, for luma samples, the line of samples immediately adjacent above the video block may be referred to as reference line 0 and the subsequent above lines of samples may to respectively referred to as reference line 1, reference line 2, and reference line 3. In some cases, a reference line to use for intra prediction may be specified (e.g., according to a reference line index). In some cases, a subset of the defined possible intra-prediction modes may be available based on a reference line index. For example, when the reference line used for generating the intra-prediction is not the closest reference line (e.g., reference line index is not equal to 0), then only the intra modes in the MPM list may be available for generating the intra-prediction. Also, the MPM list may not be allowed to contain PLANAR and DC mode. Further, in one example, when the reference line used for generating the intra-prediction is the closest reference line (e.g., reference line index is equal to 0), then all the intra modes may be available for generating the intra-prediction and the MPM list may include PLANAR and DC modes.

For inter prediction coding, one or more previously decoded pictures, i.e., a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. In ITU-T H.265, for a P slice, there is a single reference picture list, RefPicList0 and for a B slice, there is a second independent reference picture list, RefPicList1, in addition to RefPicList0. It should be noted that for uni-prediction in a B slice, one of RefPicList0 or RefPicList1 may be used to generate a prediction. Further, it should be noted that in ITU-T H.265, during the decoding process, at the onset of decoding a picture, reference picture list(s) are generated from previously decoded picture stored in a decoded picture buffer (DPB).

Further, a coding standard may support various modes of motion vector prediction. Motion vector prediction enables the value of a motion vector to be derived based on another motion vector. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). ITU-T H.265 supports two modes for motion vector prediction: a merge mode and so-called Advanced Motion Vector Prediction (AMVP). In ITU-T H.265, for both the merge mode and the AMVP for a current PB, a set of candidate blocks is derived. Both a video encoder and video decoder perform the same process to derive a set of candidates. Thus, for a current video block, the same set of candidates is generated during encoding and decoding. A candidate block includes a video block having associated motion information from which motion information used to generate a prediction for a current video block can be derived. For the merge mode in ITU-T H.265, all motion information (i.e., motion vector displacement values, reference picture indices, and reference picture lists) associated with a selected candidate is inherited as the motion information for the current PB. That is, at a video encoder, a candidate block is selected from the derived set of candidates and an index value included in the bitstream indicates the selected candidate and thus, indicates the motion information for the current PB. For AMVP in ITU-T H.265, the motion vector information for the selected candidate is used as a motion vector predictor (MVP) for the motion vector of the current PB. That is, at a video encoder, a candidate block is selected from the derived set of candidates and an index value indicating the selected candidate and a delta value (i.e., a motion vector delta (MVD)) indicating the difference between the motion vector predictor and the motion vector for the current PB are included in the bitstream. Further, for AMVP in ITU-T H.265, syntax elements identifying a reference picture are included in the bitstream. In ITU-T H.265, a set of candidate blocks may be derived from spatial neighboring blocks, and temporal blocks. Further, generated (or default) motion information may be used for motion vector prediction.

As described above, intra prediction data or inter prediction data indicate how a prediction is generating for a current video block. JVET-L1001, further includes a so-called multi-hypothesis prediction technique which provides signaling that combines inter-picture merge and intra-picture prediction. That is, in JVET-L1001, when multi-hypothesis prediction is enabled, sub-blocks within a coding unit may be coded using inter prediction or intra prediction. As described above, in some cases, only a subset of the defined possible intra-prediction modes may be available for generating a prediction for a current block. With respect to multi-hypothesis prediction, when multi-hypothesis prediction is applied for a video block, an intra MPM list is constructed that only includes PLANAR, DC, vertical and horizontal modes and the intra-prediction mode used for the video block may only be one of the modes in the MPM list.

Table 1 illustrates the relevant coding unit syntax provided in JVET-L1001 for basic intra prediction and multi-hypothesis prediction.

TABLE 1

| | Descriptor |
|---|---|
| coding_unit( x0, y0, cbWidth, cbHeight, treeType ) { | |
|     if( slice_type != I ) { | |
|         cu_skip_flag[ x0 ][ y0 ] | ae(v) |
|         if( cu_skip_flag[ x0 ][ y0 ] = = 0 ) | |
|             pred_mode_flag | ae(v) |
|     } | |
|     if( CuPredMode[ x0 ][ y0 ] = = MODE_INTRA ) { | |
| ... | |
|     } else { | |
|         if( treeType = = SINGLE_TREE || treeType = = DUAL_TREE_LUMA ) | |
|     { | |
|             if( ( y0% CtbSizeY ) > 0 ) | |
|                 intra_luma_ref_idx[ x0 ][ y0 ] | ae(v) |
|             if (intra_luma_ref_idx[ x0 ][ y0 ] = = 0) | |
|                 intra_luma_mpm_flag[ x0 ][ y0 ] | ae(v) |
|             if( intra_luma_mpm_flag[ x0 ][ y0 ] ) | |
|                 intra_luma_mpm_idx[ x0 ][ y0 ] | ae(v) |
|             else | |
|                 intra_luma_mpm_remainder[ x0 ][ y0 ] | ae(v) |
|         } | |
|         if( treeType = = SINGLE_TREE || treeType = = DUAL_TREE_CHROMA ) | |
|             intra_chroma_pred_mode[ x0 ][ y0 ] | ae(v) |
|     } | |
|     } else { /* MODE_INTER */ | |
|         if( cu_skip_flag[ x0 ][ y0 ] = = 0 ) { | |
|             merge_flag[ x0 ][ y0 ] | ae(v) |
|             if( merge_flag[ x0 ][ y0 ] ) { | |
|                 merge_data( x0, y0, cbWidth, cbHeight ) | |
|             } else { | |
|                 ... | |
|             } | |
|         } | |
|         ... | |
|         if( CuPredMode[ x0 ][ y0 ] != MODE_INTRA && cu_skip_flag[ x0 ][ y0 ] = = 0 ) | |
|             cu_cbf | ae(v) |
|         if( cu_cbf ) | |
|             transform_tree( x0, y0, cbWidth, cbHeight, treeType ) | |
|     } | |
| } | |

With respect to Table 1, JVET-L1001 provides the following definitions of the respective syntax elements:

cu_skip_flag[x0][y0] equal to 1 specifies that for the current coding unit, when decoding a P or B slice, no more syntax elements except one or more of the following are parsed after cu_skip_flag[x0][y0]: the merge plus MVD flag mmvd_flag[x0][y0], the merge plus MVD index mmvd_merge_flag[x0][y0], the merge plus MVD distance index mmvd distance_idx[x0][y0], the merge plus MVD direction index mmvd_direction_idx[x0][y0], the merging candidate index merge_idx[x0][y0] the subblock-based merge flag merge_subblock_flag[x0][y0], the subblock-based merging candidate index merge_subblock_idx[x0][y0], the merge triangle flag merge_triangle_flag[x0][y0], and the merge triangle index merge_triangle_index[x0][y0]. cu_skip_flag[x0][y0] equal to 0 specifies that the coding unit is not skipped. The array indices x0, y0 specify the location (x0, y0) of the top-left luma sample of the considered coding block relative to the top-left luma sample of the picture.

When cu_skip_flag[x0][y0] is not present, it is inferred to be equal to 0.

pred_mode_flag equal to 0 specifies that the current coding unit is coded in inter prediction mode. pred_mode_flag equal to 1 specifies that the current coding unit is coded in intra prediction mode. The variable CuPredMode[x][y] is derived as follows for x=x0 . . . x0+cbWidth−1 and y=y0 . . . y0+cbHeight−1:

If pred_mode_flag is equal to 0, CuPredMode[x][y] is set equal to MODE_INTER.

Otherwise (pred_mode_flag is equal to 1), CuPredMode[x][y] is set equal to MODE_INTRA.

When pred_mode_flag is not present, the variable CuPredMode[x][y] is inferred to be equal to MODE_INTRA for x=x0 . . . x0+cbWidth−1 and y=y0 . . . y0+cbHeight−1.

intra_luma_ref_idx[x0][y0] specifies the intra prediction reference line index IntraLumaRefLineIdx[x][y] for x=x0 . . . x0+cbWidth−1 and y=y0 . . . y0+cbHeight−1 as specified in Table 2.

When intra_luma_ref_idx[x0][y0] is not present it is inferred to be equal to 0.

TABLE 2

| intra_luma_ref_idx[ x0 ] [ y0 ] | IntraLumaRefLineIdx[ x ][ y ]<br>x = x0 . . . x0 + cbWidth − 1<br>y = y0 . . . y0 + cbHeight − 1 |
|---|---|
| 0 | 0 |
| 1 | 1 |
| 2 | 3 |

The syntax elements intra_luma_mpm_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit according to the process provided below.

When intra_luma_mpm_flag[x0][y0] is not present, it is inferred to be equal to 1.

intra_chroma_pred_mode[x0][y0] specifies the intra prediction mode for chroma samples. The array indices x0, y0 specify the location (x0, y0) of the top-left luma sample of the considered coding block relative to the top-left luma sample of the picture.

merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.

When merge_flag[x0][y0] is not present, it is inferred as follows:

If cu_skip_flag[x0][y0] is equal to 1, merge_flag[x0][y0] is inferred to be equal to 1.

Otherwise, merge_flag[x0][y0] is inferred to be equal to 0.

cu_cbf equal to 1 specifies that the transform_tree( ) syntax structure is present for the current coding unit. cu_cbf equal to 0 specifies that the transform_tree( ) syntax structure is not present for the current coding unit.

When cu_cbf is not present, it is inferred as follows:

If cu_skip_flag[x0][y0] is equal to 1, cu_cbf is inferred to be equal to 0.

Otherwise, cu_cbf is inferred to be equal to 1.

With respect to a process for inferring a intra prediction mode from a neighbouring intra-predicted coding unit, JVET-L1001 provides the following:

Input to this process are:

a luma location (xCb, yCb) specifying the top-left sample of the current luma coding block relative to the top-left luma sample of the current picture, a variable cbWidth specifying the width of the current coding block in luma samples, a variable cbHeight specifying the height of the current coding block in luma samples.

In this process, the luma intra prediction mode IntraPredModeY[xCb][yCb] is derived.

Table 3 specifies the value for the intra prediction mode IntraPredModeY[xCb][yCb] and the associated names.

TABLE 3

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

The intra prediction modes INTRA_LT_CCLM, INTRA_L_CCLM and INTRA_T_CCLM are only applicable to chroma components.

IntraPredModeY[xCb][yCb] is derived by the following ordered steps:
1. The neighbouring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:
   The availability derivation process for a block is invoked with the location (xCurr, yCurr) set equal to (xCb, yCb) and the neighbouring location (xNbY, yNbY) set equal to (xNbX, yNbX) as inputs, and the output is assigned to availableX.
   The candidate intra prediction mode candIntraPredModeX is derived as follows:
      If one or more of the following conditions are true, candIntraPredModeX is set equal to INTRA_PLANAR.
         The variable availableX is equal to FALSE.
         CuPredMode[xNbX][yNbX] is not equal to MODE_INTRA and mh_intra_flag[xNbX][yNbX] is not equal to 1.
         pcm_flag[xNbX][yNbX] is equal to 1.
         X is equal to B and yCb−1 is less than ((yCb>>Ctb Log 2SizeY)<Ctb Log 2SizeY).
      Otherwise, candIntraPredModeX is set equal to IntraPredModeY[xNbX][yNbX].
3. The candModeList[x] with x=0 . . . 5 is derived as follows:
   If candIntraPredModeB is equal to candIntraPredModeA and candIntraPredModeA is greater than INTRA_DC, candModeList[x] with x=0 . . . 5 is derived as follows:
      If IntraLumaRefLineIdx[xCb][yCb] is equal to 0, the following applies:
         candModeList[0]=candIntraPredModeA
         candModeList[1]=INTRA_PLANAR
         candModeList[2]=INTRA_DC
         candModeList[3]=2+((candIntraPredModeA+61)% 64)
         candModeList[4]=2+((candIntraPredModeA−1)% 64)
         candModeList[5]=2+((candIntraPredModeA+60)% 64)
      Otherwise (IntraLumaRefLineIdx[xCb][yCb] is not equal to 0), the following applies:
         candModeList[0]=candIntraPredModeA
         candModeList[1]=2+((candIntraPredModeA+61)% 64)
         candModeList[2]=2+((candIntraPredModeA−1)% 64)
         candModeList[3]=2+((candIntraPredModeA+60)% 64)
         candModeList[4]=2+(candIntraPredModeA % 64)
         candModeList[5]=2+((candIntraPredModeA+59)% 64)
   Otherwise if candIntraPredModeB is not equal to candIntraPredModeA and candIntraPredModeA or candIntraPredModeB is greater than INTRA_DC, the following applies:
      The variables minAB and maxAB are derived as follows:
         minAB=Min(candIntraPredModeA, candIntraPredModeB)
         maxAB=Max(candIntraPredModeA, candIntraPredModeB)
      If candIntraPredModeA and candIntraPredModeB are both greater than INTRA_DC, candModeList[x] with x=0 . . . 5 is derived as follows:
         candModeList[0]=candIntraPredModeA
         candModeList[1]=candIntraPredModeB
            If IntraLumaRefLineIdx[xCb][yCb] is equal to 0, the following applies:
               candModeList[2]=INTRA_PLANAR
               candModeList[3]=INTRA_DC
               If maxAB−minAB is in the range of 2 to 62, inclusive, the following applies:
                  candModeList[4]=2+((maxAB+61)% 64)
                  candModeList[5]=2+((maxAB−1)% 64)
               Otherwise, the following applies:
                  candModeList[4]=2+((maxAB+60)% 64)
                  candModeList[5]=2+((maxAB) % 64)
            Otherwise (IntraLumaRefLineIdx[xCb][yCb] is not equal to 0), the following applies:
               If maxAB−minAB is equal to 1, the following applies:
                  candModeList[2]=2+((minAB+61)% 64)
                  candModeList[3]=2+((maxAB−1)% 64)
                  candModeList[4]=2+((minAB+60)% 64)
                  candModeList[5]=2+(maxAB % 64)
               Otherwise if maxAB−minAB is equal to 2, the following applies:
                  candModeList[2]=2+((minAB−1)% 64)
                  candModeList[3]=2+((minAB+61)% 64)
                  candModeList[4]=2+((maxAB−1)% 64)
                  candModeList[5]=2+((minAB+60)% 64)
               Otherwise if maxAB−minAB is greater than 61, the following applies:
                  candModeList[2]=2+((minAB−1)% 64)
                  candModeList[3]=2+((maxAB+61)% 64)
                  candModeList[4]=2+(minAB % 64)
                  candModeList[5]=2+((maxAB+60)% 64)
               Otherwise, the following applies:
                  candModeList[2]=2+((minAB+61)% 64)
                  candModeList[3]=2+((minAB−1)% 64)
                  candModeList[4]=2+((maxAB+61)% 64)
                  candModeList[5]=2+((maxAB−1)% 64)
      Otherwise (candIntraPredModeA or candIntraPredModeB is greater than INTRA_DC), candModeList[x] with x=0 . . . 5 is derived as follows:
         If IntraLumaRefLineIdx[xCb][yCb] is equal to 0, the following applies:
            candModeList[0]=candIntraPredModeA
            candModeList[1]=candIntraPredModeB
            candModeList[2]=1−minAB
            candModeList[3]=2+((maxAB+61)% 64)
            candModeList[4]=2+((maxAB−1)% 64)
            candModeList[5]=2+((maxAB+60)% 64)
         Otherwise (IntraLumaRefLineIdx[xCb][yCb] is not equal to 0), the following applies:
            candModeList[0]=maxAB
            candModeList[1]=2+((maxAB+61)% 64)
            candModeList[2]=2+((maxAB−1)% 64)
            candModeList[3]=2+((maxAB+60)% 64)
            candModeList[4]=2+(maxAB % 64)
            candModeList[5]=2+((maxAB+59)% 64)

Otherwise, the following applies:
  If IntraLumaRefLineIdx[xCb][yCb] is equal to 0, the following applies:
    candModeList[0]=candIntraPredModeA
    candModeList[1]=(candModeList[0]==INTRA_PLANAR)? INTRA_DC INTRA_PLANAR
    candModeList[2]=INTRA_ANGULAR50
    candModeList[3]=INTRA_ANGULAR18
    candModeList[4]=INTRA_ANGULAR46
    candModeList[5]=INTRA_ANGULAR54
  Otherwise (IntraLumaRefLineIdx[xCb][yCb] is not equal to 0), the following applies:
    candModeList[0]=INTRA_ANGULAR50
    candModeList[1]=INTRA_ANGULAR18
    candModeList[2]=INTRA_ANGULAR2
    candModeList[3]=INTRA_ANGULAR34
    candModeList[4]=INTRA_ANGULAR66
    candModeList[5]=INTRA_ANGULAR26
4. IntraPredModeY[xCb][yCb] is derived by applying the following procedure:
  If intra_luma_mpm_flag[xCb][yCb] is equal to 1, the IntraPredModeY[xCb][yCb] is set equal to candModeList[intra_luma_mpm_idx[xCb][yCb]].
  Otherwise, IntraPredModeY[xCb][yCb] is derived by applying the following ordered steps:
    1. When candModeList[i] is greater than candModeList[j] for i=0 ... 4 and for each i, j=(i+1) ... 5, both values are swapped as follows: (candModeList[i], candModeList[j])=Swap(candModeList[i], candModeList[j])
    2. IntraPredModeY[xCb][yCb] is derived by the following ordered steps:
      i. IntraPredModeY[xCb][yCb] is set equal to intra_luma_mpm_remainder[xCb][yCb].
      ii. For i equal to 0 to 5, inclusive, when IntraPredModeY[xCb][yCb] is greater than or equal to candModeList[i], the value of IntraPredModeY[xCb][yCb] is incremented by one.

The variable IntraPredModeY[x][y] with x=xCb ... xCb+cbWidth−1 and y=yCb ... yCb+cbHeight−1 is set to be equal to IntraPredfModeY[xCb][yCb].

As illustrated in Table 1, merge_flag is true, merge_data syntax is present. Table 4 illustrates the merge data syntax provided in JVET-L1001:

TABLE 4

|  | Descriptor |
|---|---|
| merge_data( x0, y0, cbWidth, cbHeight ) { |  |
|   mmvd_flag[ x0 ][ y0 ] | ae(v) |
|   if( mmvd_flag[ x0 ][ y0 ] = = 1 ) { |  |
|     mmvd_merge_flag[ x0 ][ y0 ] | ae(v) |
|     mmvd_distance_idx[ x0 ][ y0 ] | ae(v) |
|     mmvd_direction_idx[ x0 ][ y0 ] | ae(v) |
|   } else { |  |
|     if( MaxNumSubblockMergeCand > 0 && cbWidth >= 8 && cbHeight >= 8 ) |  |
|       merge_subblock_flag[ x0 ][ y0 ] | ae(v) |
|     if( merge_subblock_flag[ x0 ][ y0 ] = = 1 ) { |  |
|       if( MaxNumSubblockMergeCand > 1 ) |  |
|         merge_subblock_idx[ x0 ][ y0 ] | ae(v) |
|     } else { |  |
|       if( sps_mh_intra_enabled_flag && cu_skip_flag[ x0 ][ y0 ] = = 0 && ( cbWidth * cbHeight ) >= 64 && cbWidth < 128 && cbHeight < 128 ) { |  |
|         mh_intra_flag[ x0 ][ y0 ] | ae(v) |
|         if( mh_intra_flag[ x0 ][ y0 ] ) { |  |
|           if ( cbWidth <= 2 * cbHeight || cbHeight <= 2 * cbWidth ) |  |
|             mh_intra_luma_mpm_flag[ x0 ][ y0 ] | ae(v) |
|           if( mh_intra_luma_mpm_flag[ x0 ][ y0 ] ) |  |
|             mh_intra_luma_mpm_idx[ x0 ][ y0 ] | ae(v) |
|         } |  |
|       } |  |
|       ... |  |
|       else if( MaxNumMergeCand > 1 ) |  |
|         merge_idx[ x0 ][ y0 ] | ae(v) |
|     } |  |
|   } |  |
| } |  |

With respect to Table 4, JVET-L1001 provides the following definitions of the respective syntax elements:

mmvd_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.

When mmvd_flag[x0][y0] is not present, it is inferred to be equal to 0.

mmvd_merge_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

mmvd_distance_idx[x0][y0] specifies the index used to derive MmvdDistance[x0][y0] as specified in Table 5. The array indices x0, y0 specify the location (x0, y0) of the top-left luma sample of the considered coding block relative to the top-left luma sample of the picture.

TABLE 5

| mmvd_distance_idx[ x0 ][ y0 ] | MmvdDistance[ x0 ][ y0 ] |
| --- | --- |
| 0 | 1 |
| 1 | 2 |
| 2 | 4 |
| 3 | 8 |
| 4 | 16 |
| 5 | 32 |
| 6 | 64 |
| 7 | 128 | mmvd_direction_idx[x0][y0] specifies index used to derive MmvdSign[x0][y0] as specified in Table 6. The array indices x0, y0 specify the location (x0, y0) of the top-left luma sample of the considered coding block relative to the top-left luma sample of the picture.

TABLE 6

| mmvd_direction_idx[ x0 ][ y0 ] | MmvdSign[ x0 ][ y0 ][0] | MmvdSign[ x0 ][ y0 ][1] |
| --- | --- | --- |
| 0 | +1 | 0 |
| 1 | −1 | 0 |
| 2 | 0 | +1 |
| 3 | 0 | −1 |

Both components of the merge plus MVD offset MmvdOffset[x0][y0] are derived as follows:
MmvdOffset[x0][y0][0]=(MmvdDistance[x0][y0]<<2)
 *MmvdSign[x0][y0][0]
MmvdOffset[x0][y0][1]=(MmvdDistance[x0][y0]<<2)
 *MmvdSign[x0][y0][1]

merge_subblock_flag[x0][y0] specifies whether the subblock-based inter prediction parameters for the current coding unit are inferred from neighbouring blocks. The array indices x0, y0 specify the location (x, y0) of the top-left luma sample of the considered coding block relative to the top-left luma sample of the picture. When merge_subblock_flag[x0][y0] is not present, it is inferred to be equal to 0.

merge_subblock_idx[x0][y0] specifies the merging candidate index of the subblock-based merging candidate list where x0, y0 specify the location (x0, y0) of the top-left luma sample of the considered coding block relative to the top-left luma sample of the picture.

When merge_subblock_idx[x0][y0] is not present, it is inferred to be equal to 0.

mh_intra_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When mh_intra_flag[x0][y0] is not present, it is inferred to be equal to 0.

The syntax elements mh_intra_luma_mpm_flag[x0][y0], and mh_intra_luma_mpm_idx[x0][y0] specify the intra prediction mode for luma samples used in combined inter-picture merge and intra-picture prediction. The array indices x0, y0 specify the location (x, y0) of the top-left luma sample of the considered coding block relative to the top-left luma sample of the picture. The intra prediction mode is derived according to to the process provided below.

When mh_intra_luma_mpm_flag[x0][y0] is not present, it is inferred as follows:
  If cbWidth is greater than 2*cbHeight or cbHeight is greater than 2*cbWidth, mh_intra_luma_mpm_flag[x0][y0] is inferred to be equal to 1.
  Otherwise, mh_intra_luma_mpm_flag[x0][y0] is inferred to be equal to 0.

merge_idx[x0][y0] specifies the merging candidate index of the merging candidate list where x0, y0 specify the location (x, y0) of the top-left luma sample of the considered coding block relative to the top-left luma sample of the picture.

When merge_idx[x0][y0] is not present, it is inferred as follows:
  If mmvd_flag[x0][y0] is equal to 1, merge_idx[x0][y0] is inferred to be equal to mmvd_merge_flag[x0][y0].
  Otherwise (mmvd_flag[x0][y0] is equal to 0), merge_idx[x0][y0] is inferred to be equal to 0.

With respect to a process for deriving a intra prediction mode in combined merge and intra prediction (mh_intra_flag is true), JVET-L1001 provides the following:
  Input to this process are:
    a luma location (xCb, yCb) specifying the top-left sample of the current luma coding block relative to the top-left luma sample of the current picture,
    a variable cbWidth specifying the width of the current coding block in luma samples,
    a variable cbHeight specifying the height of the current coding block in luma samples.
  In this process, the intra prediction mode IntraPredModeY[xCb][yCb] is derived by the following ordered steps:
    1. The neighbouring locations (xNbA, yNbA) and (xNbB, yNbB) are set equal to (xCb−1, yCb) and (xCb, yCb−1), respectively.

2. For X being replaced by either A or B, the variables candIntraPredModeX are derived as follows:
   The availability derivation process for a block is invoked with the location (xCurr, yCurr) set equal to (xCb, yCb) and the neighbouring location (xNbY, yNbY) set equal to (xNbX, yNbX) as inputs, and the output is assigned to availableX.
   The candidate intra prediction mode candIntraPredModeX is derived as follows:
   If one or more of the following conditions are true, candIntraPredModeX is set equal to INTRA_DC.
   The variable availableX is equal to FALSE.
   CuPredMode[xNbX][yNbX] is not equal to MODE_INTRA and mh_intra_flag[xNbX][yNbX] is not equal to 1.
   X is equal to B and yCb−1 is less than ((yCb>>Ctb Log 2SizeY)<<Ctb Log 2SizeY).
   Otherwise, candIntraPredModeX is derived as follows:
   If IntraPredModeY[xNbX][yNbX] is greater than INTRA_ANGULAR34, candIntraPredModeX is set equal to INTRA_ANGULAR50.
   Otherwise, if IntraPredModeY[xNbX][yNbX] is less than or equal to INTRA_ANGULAR34 and IntraPredModeY[xNbX][yNbX] is greater than INTRA_DC, candIntraPredModeX is set equal to INTRA_ANGULAR18.
   Otherwise, candIntraPredModeX is set equal to IntraPredModeY[xNbX][yNbX].
3. The candidate mode list candModeList[x] with x=0 . . . 2 is derived as follows:
   If candIntraPredModeB is equal to candIntraPredModeA, the following applies:
   If candIntraPredModeA is less than 2 (i.e., equal to INTRA_PLANAR or INTRA_DC), candModeList[x] with x=0 . . . 2 is derived as follows:
   candModeList[0]=INTRA_PLANAR
   candModeList[1]=INTRA_DC
   candModeList[2]=INTRA_ANGULAR50
   Otherwise, candModeList[x] with x=0 . . . 2 is derived as follows:
   candModeList[0]=candIntraPredModeA
   candModeList[1]=INTRA_PLANAR
   candModeList[2]=INTRA_DC
   Otherwise (candIntraPredModeB is not equal to candIntraPredModeA), the following applies:
   candModeList[0] and candModeList[1] are derived as follows:
   candModeList[0]=candIntraPredModeA
   candModeList[1]=candIntraPredModeB
   If neither of candModeList[0] and candModeList[1] is equal to INTRA_PLANAR, candModeList[2] is set equal to INTRA_PLANAR,
   Otherwise, if neither of candModeList[0] and candModeList[1] is equal to INTRA_DC, candModeList[2] is set equal to INTRA_DC,
   Otherwise, candModeList[2] is set equal to INTRA_ANGULAR50.
4. The following process is applied to update candModeList
   If cbHeight is greater than 2*cbWidth and one of candModeList[x], with x=0 . . . 2 is equal to INTRA_ANGULAR50, the coressponding candModeList[x] is replaced with candIntraPredModeC, which is derived as follows:
   If none of candModeList[x], with x=0 . . . 2 is equal to INTRA_PLANAR, candIntraPredModeC is set equal to INTRA_PLANAR.
   Otherwise, if none of candModeList[x], x=0 . . . 2 is equal to INTRA_DC, candIntraPredModeC is set equal to INTRA_DC.
   Otherwise, if none of candModeList[x], with x=0 . . . 2 is equal to INTRA_ANGULAR50, candIntraPredModeC is set equal to INTRA_ANGULAR50.
   Otherwise (none of candModeList[x], x=0 . . . 2 is equal to INTRA_ANGULAR18). candIntraPredModeC is set equal to INTRA_ANGULAR18.
   Otherwise, if cbWidth is greater than 2*cbHeight and if one of candModeList[x], with x=0.2 is equal to INTRA_ANGULAR18, the coressponding candModeList[x] is replaced with candIntraPredModeC, which is derived as follows:
   If none of candModeList[x], with x=0 . . . 2 is equal to INTRA_PLANAR, candIntraPredModeC is set equal to INTRA_PLANAR.
   Otherwise, if none of candModeList[x], x=0 . . . 2 is equal to INTRA_DC, candIntraPredModeC is set equal to INTRA_DC.
   Otherwise, if none of candModeList[x], with x=0 . . . 2 is equal to INTRA_ANGULAR50, candIntraPredModeC is set equal to INTRA_ANGULAR50.
   Otherwise (none of candModeList[x], x=0 . . . 2 is equal to INTRA_ANGULAR18). candIntraPredModeC is set equal to INTRA_ANGULAR18.
5. IntraPredModeY[xCb][yCb] is derived by applying the following procedure:
   If mh_intra_luma_mpm_flag[xCb][yCb] is equal to 1, IntraPredModeY[xCb][yCb] is set equal to candModeList[intra_luma_mpm_idx[xCb][yCb]].
   Otherwise, IntraPredModeY[xCb][yCb] is set to equal to candIntraPredModeC, which is derived as follows:
   If none of candModeList[x], with x=0 . . . 2 is equal to INTRA_PLANAR, candIntraPredModeC is set equal to INTRA_PLANAR.
   Otherwise, if none of candModeList[x], x=0 . . . 2 is equal to INTRA_DC, candIntraPredModeC is set equal to INTRA_DC.
   Otherwise, if none of candModeList[x], with x=0 . . . 2 is equal to INTRA_ANGULAR50, candIntraPredModeC is set equal to INTRA_ANGULAR50.
   Otherwise (none of candModeList[x], x=0 . . . 2 is equal to INTRA_ANGULAR18). candIntraPredModeC is set equal to INTRA_ANGULAR18.
   The variable IntraPredModeY[x][y] with x=xCb . . . xCb+cbWidth−1 and y=yCb . . . yCb+cbHeight−1 is set to be equal to IntraPredModeY[xCb][yCb].

Thus, in JVET-L1001, there are distinct constructions of MPM lists according to basic intra prediction and multi-hypothesis prediction, which may be less than ideal.

Figure 4:
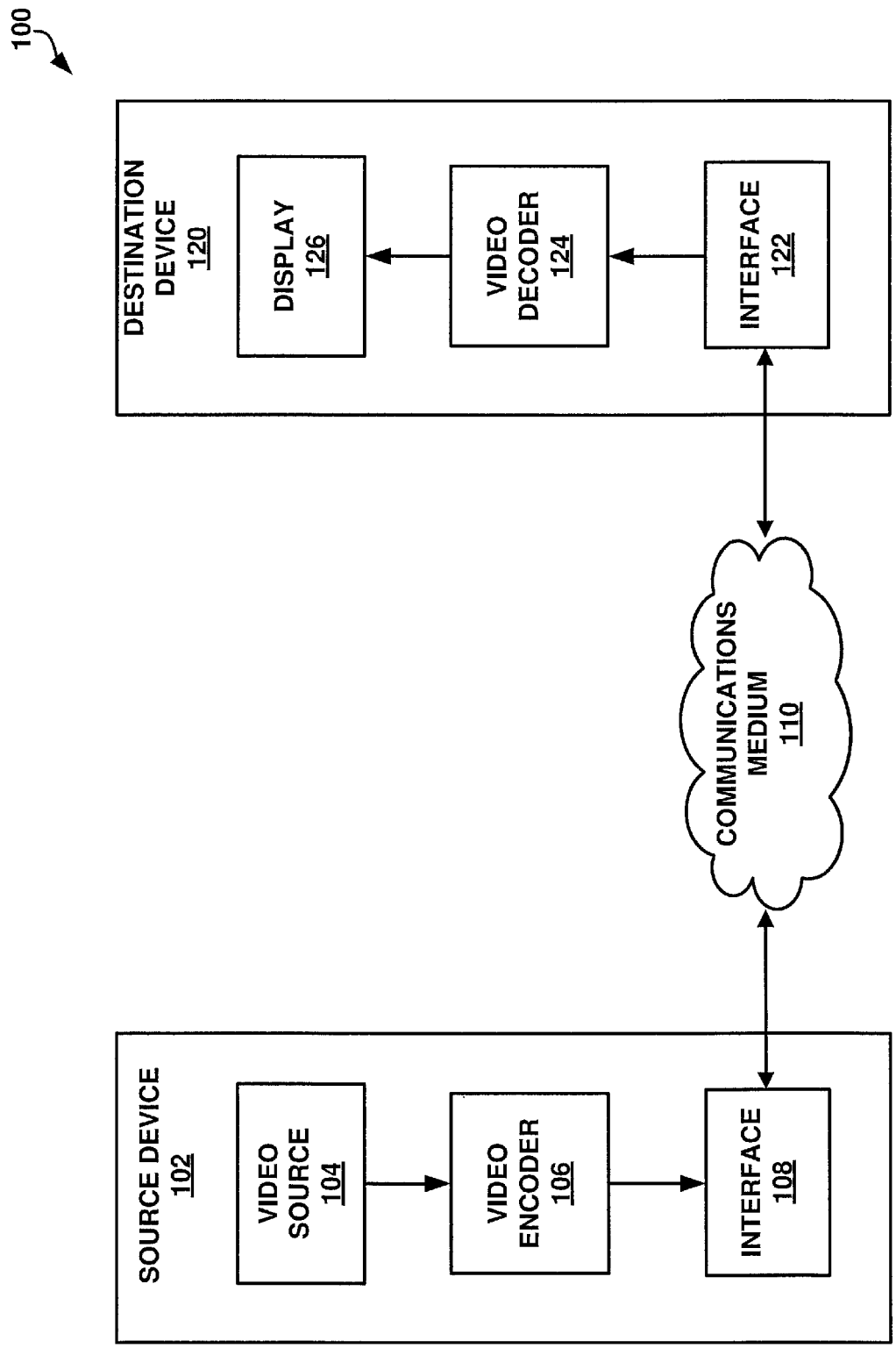
FIG. 4 is a block diagram illustrating an example of a system that may be configured to encode and decode video data according to one or more techniques of this disclosure.

FIG. 4 is a block diagram illustrating an example of a system that may be configured to code (i.e., encode and/or decode) video data according to one or more techniques of this disclosure. System 100 represents an example of a system that may perform video coding using intra prediction techniques described according to one or more examples of this disclosure. As illustrated in FIG. 4, system 100 includes source device 102, communications medium 110, and destination device 120. In the example illustrated in FIG. 4, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 4, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 4, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 8, video decoder 124 is described as outputting data to display 126, video decoder 124 may be configured to output video data to various types of devices and/or sub-components thereof. For example, video decoder 124 may be configured to output video data to any communication medium, as described herein.

Figure 5:
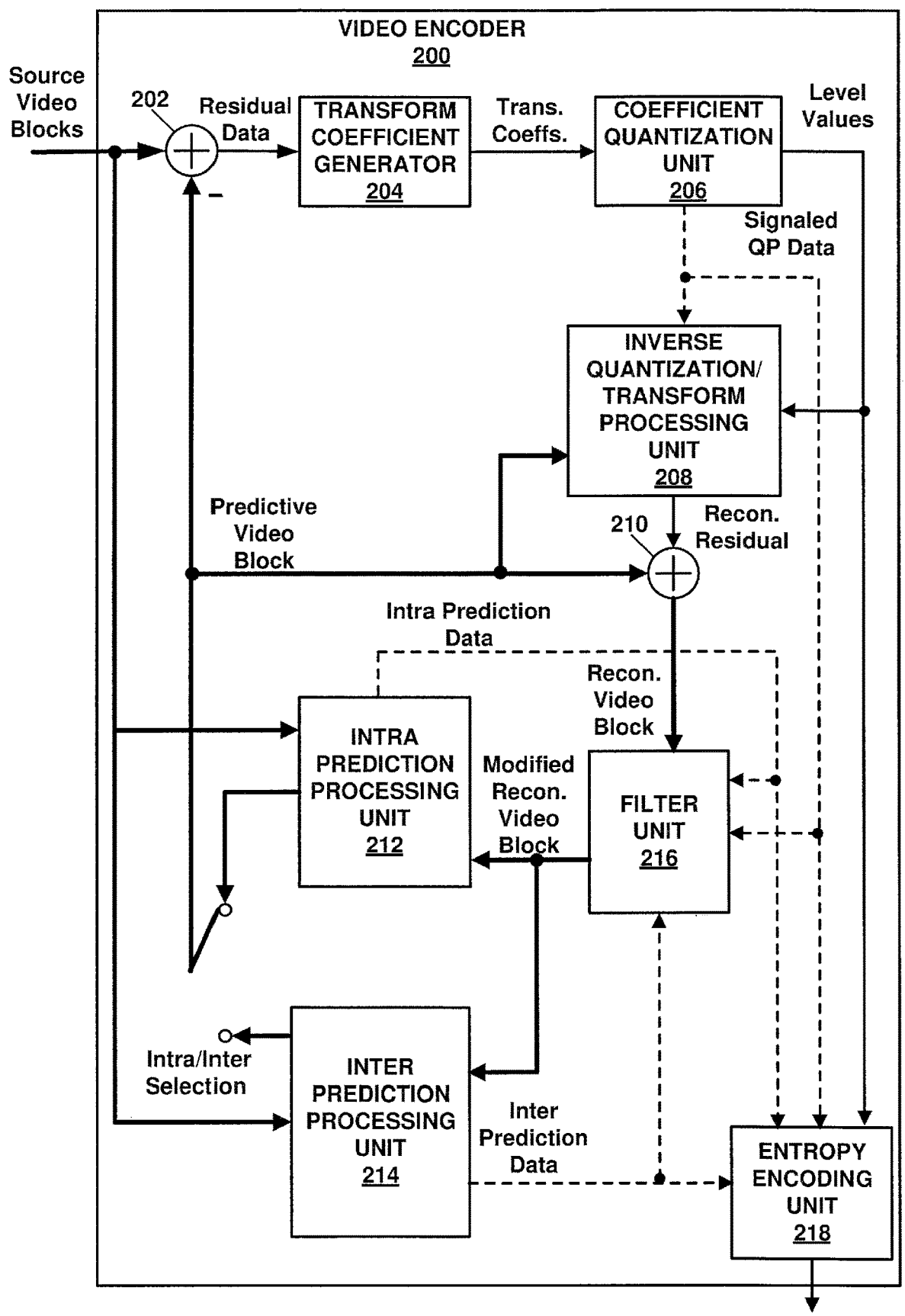
FIG. 5 is a block diagram illustrating an example of a video encoder that may be configured to encode video data according to one or more techniques of this disclosure.

FIG. 5 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 5, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional subdivisions of source video blocks. It should be noted that some techniques described herein may be generally applicable to video coding, regardless of how source video data is partitioned prior to and/or during encoding. In the example illustrated in FIG. 5, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 5, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206. Coefficient quantization unit 206 may be configured to perform quantization of the transform coefficients. As described above, the degree of quantization may be modified by adjusting a quantization parameter. Coefficient quantization unit 206 may be further configured to determine quantization parameters (QP) and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 5, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 5, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction mode. Intra prediction processing unit 212 may be configured to select an intra prediction mode for a current video block. Intra prediction processing unit 212 may be configured to evaluate a frame and/or an area thereof and determine an intra prediction mode to use to encode a current block. As illustrated in FIG. 5, intra prediction processing unit 212 outputs intra prediction data (e.g., syntax elements) to entropy encoding unit 218 and transform coefficient generator 204.

Referring again to FIG. 5, inter prediction processing unit 214 may be configured to perform inter prediction coding for a current video block. Inter prediction processing unit 214 may be configured to receive source video blocks and calculate motion information for PUs of a video block. A motion vector may indicate the displacement of a PU (or similar coding structure) of a video block within a current video frame relative to a predictive block within a reference frame. Inter prediction coding may use one or more reference pictures. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. Inter prediction processing unit 214 may output motion prediction data for a calculated motion vector to entropy encoding unit 218.

As described above, in JVET-L1001, there are distinct constructions of MPM lists according to basic intra prediction and multi-hypothesis prediction, which may be less than ideal. In one example, according to the techniques herein, video encoder 200 may be configured to harmonize and/or simplify the construction of MPM lists. In particular, in one example, video encoder 200 may be configured such that one of more the following are applied when constructing a MPM list: PLANAR and DC modes are not included in the MPM list construction process; an angular intra mode is signaled using a flag; a PLANAR or DC mode is signaled using a flag; when non-angular intra mode (e.g., PLANAR or DC) is used, a further flag is signaled indicating which one of PLANAR or DC mode is used; when angular intra mode is used, the intra MPM list only includes angular modes, a flag may is signaled indicating if intra mode from MPM list is used or not and the non-MPM list mode signaling is modified, it is restricted to angular modes only and does not contain PLANAR or DC modes.

In one example, according to the techniques herein, video encoder 200 may be configured to construct an MPM list based on the example syntax illustrated in Table 7 and Table 8.

TABLE 7

| | Descriptor |
|---|---|
| coding_unit( x0, y0, cbWidth, cbHeight, treeType ) { | |
|     if( slice_type != I ) { | |
|         cu_skip_flag[ x0 ][ y0 ] | ae(v) |
|         if( cu_skip_flag[ x0 ][ y0 ] == 0 ) | |
|             pred_mode_flag | ae(v) |
|     } | |
|     if( CuPredMode[ x0 ][ y0 ] == MODE_INTRA ) { | |
| ... | |
|     } else { | |
|         if( treeType == SINGLE_TREE || treeType == DUAL_TREE_LUMA ) { | |
|             if( ( y0 % CtbSizeY ) > 0 ) | |
|                 intra_luma_ref_idx[ x0 ][ y0 ] | ae(v) |
|             if (intra_luma_ref_idx[ x0 ][ y0 ] == 0) | |
|                 intra_luma_angular_mode_flag[ x0 ][ y0 ] | ae(v) |
|             if (intra_luma_ref_idx[ x0 ][ y0 ] == 0 || intra_luma_angular_mode_flag[ x0 ][ y0 ] != 0){ | |
|                 intra_luma_mpm_flag[ x0 ][ y0 ] | ae(v) |
|                 if( intra_luma _mpm_flag[ x0 ][ y0 ] ) | |
|                     intra_luma_mpm_idx[ x0 ][ y0 ] | ae(v) |
|                 else | |
|                     intra_luma_mpm_remainder[ x0 ][ y0 ] | ae(v) |
|             } else | |
|                 intra_luma_planar_flag[ x0 ][ y0 ] | ae(v) |
|         } | |
|         if( treeType == SINGLE_TREE || treeType == DUAL_TREE_CHROMA ) | |
|             intra_chroma_pred_mode[ x0 ][ y0 ] | ae(v) |
|     } | |
|     } else { /* MODE_INTER */ | |
|         if( cu_skip_flag[ x0 ][ y0 ] == 0 ) { | |
|             merge_flag[ x0 ][ y0 ] | ae(v) |
|         if( merge_flag[ x0 ][ y0 ] ) { | |
|             merge_data( x0, y0, cbWidth, cbHeight ) | |
|         } else { | |
| ... | |
|         } | |
|     } | |
| ... | |
|     if( CuPredMode[ x0 ][ y0 ] != MODE_INTRA && cu_skip_flag[ x0 ][ y0 ] == 0 ) | |
|         cu_cbf | ae(v) |
|     if( cu_cbf ) | |
|         transform_tree( x0, y0, cbWidth, cbHeight, treeType ) | |
|     } | |
| } | |

TABLE 8

| | Descriptor |
|---|---|
| merge_data( x0, y0, cbWidth, cbHeight ) { | |
|     mmvd_flag[ x0 ][ y0 ] | ae(v) |
|     if( mmvd_flag[ x0 ][ y0 ] == 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|     } else { | |
|         if( MaxNumSubblockMergeCand > 0 && cbWidth >= 8 && cbHeight >= 8 ) | |
|             merge_subblock_flag[ x0 ][ y0 ] | ae(v) |
|         if( merge_subblock_flag[ x0 ][ y0 ] == 1 ) { | |
|             if( MaxNumSubblockMergeCand > 1 ) | |
|                 merge_subblock_idx[ x0 ][ y0 ] | ae(v) |
|         } else { | |
|             if( sps_mh_intra_enabled_flag && cu_skip_flag[ x0 ][ y0 ] == 0 && ( cbWidth * cbHeight ) >= 64 && cbWidth < 128 && cbHeight < 128 ) { | |
|                 mh_intra_flag[ x0 ][ y0 ] | ae(v) |
|                 if( mh_intra_flag[ x0 ][ y0 ] ) { | |
|                     if ( cbWidth <= 2 * cbHeight || cbHeight <= 2 * cbWidth) | |
|                         mh_intra_luma_angular_mode_flag[ x0 ][ y0 ] | ae(v) |
|                     if( mh_intra_angular_mode_flag[ x0 ][ y0 ] ) | |

TABLE 8-continued

|  | Descriptor |
|---|---|
|       mh_intra_luma_vert_flag[ x0 ][ y0 ] // no MPM list needed | ae(v) |
|     else | |
|       mh_intra_luma_planar_flag[ x0 ][ y0 ] | ae(v) |
|     } | |
|    } | |
| ... | |
|   else if( MaxNumMergeCand > 1 ) | |
|     merge_idx[ x0 ][ y0 ] | ae(v) |
|   } | |
|  } | |
| } | |

With respect to Table 7, the definitions of syntax elements may be based on those provided above, with respect to syntax elements, intra_luma_angular_mode_flag, intra_luma_planar_flag, intra_luma_mpm_flag, intra_luma_mpm_idx, and intra_luma_mpm_remainder, the following definitions may be used.

intra_luma_angular_mode_flag[x0][y0] equal to 1 specifies that the intra prediction mode for luma samples is angular. intra_luma_angular_mode_flag[x0][y0] equal to 0 specifies that the intra prediction mode for luma samples is not angular. When intra_luma_angular_mode_flag[x0][y0] is not present it is inferred to be equal to 1.

intra_luma_planar_flag[x0][y0] equal to 1 specifies that the intra prediction mode for luma samples is PLANAR. intra_luma_planar_flag[x0][y0] equal to 0 specifies that the intra prediction mode for luma samples is DC. When intra_luma_planar_flag[x0][y0] is not present it is inferred to be equal to 1.

The syntax elements intra_luma_mpm_flag[x0][y0], intra_luma_mpm_idx[x0][y0] and intra_luma_mpm_remainder[x0][y0] specify the angular intra prediction mode for luma samples. The array indices x0, y0 specify the location (x0, y0) of the top-left luma sample of the considered coding block relative to the top-left luma sample of the picture. When intra_luma_angular_mode_flag[x0][y0] is equal to 1 and intra_luma_mpm_flag[x0][y0] is equal to 1, the intra prediction mode is inferred from a neighbouring intra-predicted coding unit as provided below.

When intra_luma_mpm_flag[x0][y0] is not present, it is inferred to be equal to 1.

With respect to the syntax elements intra_luma_mpm_flag, intra_luma_mpm_idx and intra_luma_mpm_remainder, in one example, the process for inferring a intra prediction mode from a neighbouring intra-predicted coding unit may be based on the process provided above with the following step 3.

3. The candModeList[x] with x=0 . . . 5 is derived as follows:
  If candIntraPredModeB is equal to candIntraPredModeA and candIntraPredModeA is greater than INTRA_DC, candModeList[x] with x=0 . . . 5 is derived as follows:
   The following applies:
    candModeList[0]=candIntraPredModeA
    candModeList[1]=2+((candIntraPredModeA+61)% 64)
    candModeList[2]=2+((candIntraPredModeA−1)% 64)
    candModeList[3]=2+((candIntraPredModeA+60)% 64)
    candModeList[4]=2+(candIntraPredModeA % 64)
    candModeList[5]=2+((candIntraPredModeA+59)% 64)
 Otherwise if candIntraPredModeB is not equal to candIntraPredModeA and candIntraPredModeA or candIntraPredModeB is greater than INTRA_DC, the following applies:
  The variables minAB and maxAB are derived as follows:
   minAB=Min(candIntraPredModeA, candIntraPredModeB)
   maxAB=Max(candIntraPredModeA, candIntraPredModeB)
  If candIntraPredModeA and candIntraPredModeB are both greater than INTRA_DC, candModeList[x] with x=0 . . . 5 is derived as follows:
   candModeList[0]=candIntraPredModeA
   candModeList[1]=candIntraPredModeB
   the following applies:
   If maxAB−minAB is equal to 1, the following applies:
    candModeList[2]=2+((minAB+61)% 64)
    candModeList[3]=2+((maxAB−1)% 64)
    candModeList[4]=2+((minAB+60)% 64)
    candModeList[5]=2+(maxAB % 64)
   Otherwise if maxAB−minAB is equal to 2, the following applies:
    candModeList[2] 2+((minAB−1)% 64)
    candModeList[3]=2+((minAB+61)% 64)
    candModeList[4]=2+((maxAB−1)% 64)
    candModeList[5]=2+((minAB+60)% 64)
   Otherwise if maxAB−minAB is greater than 61, the following applies:
    candModeList[2]=2+((minAB−1)% 64)
    candModeList[3]=2+((maxAB+61)% 64)
    candModeList[4]=2+(minAB % 64)
    candModeList[5]=2+((maxAB+60)% 64)
   Otherwise, the following applies:
    candModeList[2]=2+((minAB+61)% 64)
    candModeList[3]=2+((minAB−1)% 64)
    candModeList[4]=2+((maxAB+61)% 64)
    candModeList[5]=2+((maxAB−1)% 64)
  Otherwise (candIntraPredModeA or candIntraPredModeB is greater than INTRA_DC), candModeList[x] with x=0 . . . 5 is derived as follows:
   the following applies:
    candModeList[0]=maxAB
    candModeList[1]=2+((maxAB+61)% 64)
    candModeList[2]=2+((maxAB−1)% 64)
    candModeList[3]=2+((maxAB+60)% 64)
    candModeList[4]=2+(maxAB % 64)

candModeList[5]=2+((maxAB+59)% 64)
Otherwise, the following applies:
   the following applies:
      candModeList[0]=INTRA_ANGULAR50
      candModeList[1]=INTRA_ANGULAR18
      candModeList[2]=INTRA_ANGULAR2
      candModeList[3]=INTRA_ANGULAR34
      candModeList[4]=INTRA_ANGULAR66
      candModeList[5]=INTRA_ANGULAR26

With respect to Table 8, the definitions of syntax elements may be based on those provided above, with respect to syntax elements mh_intra_luma_angular_mode_flag, mh_intra_luma_planar_flag, mh_intra_luma_angular_mode_flag, mh_intra_luma_vert_flag, and mh_intra_luma_planar_flag, the following definitions may be used.

mh_intra_luma_angular_mode_flag[x0][y0] equal to 1 specifies that the intra prediction mode for the combined inter-picture merge and intra-picture prediction for luma samples is angular. mh_intra_luma_angular_mode_flag[x0][y0] equal to 0 specifies that the intra prediction mode for the combined inter-picture merge and intra-picture prediction for luma samples is not angular. When mh_intra_luma_angular_mode_flag[x0][y0] is not present it is inferred to be equal to 1.

mh_intra_luma_planar_flag[x0][y0] equal to 1 specifies that the intra prediction mode for luma samples is PLANAR. mh_intra_luma_planar_flag[x0][y0] equal to 0 specifies that the intra prediction mode for luma samples is DC. When mh_intra_luma_planar_flag[x0][y0] is not present it is inferred to be equal to 1.

The syntax elements mh_intra_luma_angular_mode_flag[x0][y0], mh_intra_luma_vert_flag[x0][y0], and mh_intra_luma_planar_flag[x0][y0] specify the intra prediction mode for luma samples used in combined inter-picture merge and intra-picture prediction. The array indices x0, y0 specify the location (x0, y0) of the top-left luma sample of the considered coding block relative to the top-left luma sample of the picture. The intra prediction mode IntraPredModeY is derived as follows:

```
if ( mh_intra_angular_mode_flag[ x0 ][ y0 ] ) {
    IntraPredModeY = ( mh_intra_luma_vert_flag[ x0 ][ y0 ] )?
INTRA_ANGULAR50 : INTRA_ANGULAR18
} else {
    IntraPredModeY = ( mh_intra_luma_planar_flag[ x0 ][ y0 ] )?
INTRA_PLANAR : INTRA_DC
}
Note:
HORZ = INTRA_ANGULAR18
VERT = INTRA_ANGULAR50
```

It should be noted that in one example, the following syntax elements may be the same:
  intra_luma_angular_mode_flag and mh_intra_luma_angular_mode_flag
  intra_luma_planar_flag and mh_intra_luma_planar_flag
  If using same syntax element, contexts may still depend on whether multi-hypothesis (MH) or regular intra coding mode is being used.

Further, in one example, the syntax in Table 7 and Table 8 may be combined as provided in Table 8A.

TABLE 8A

| | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] == 0 ) | |
|       pred_mode_flag | ae(v) |
|   } | |
|   if( CuPredMode[ x0 ][ y0 ] == MODE_INTRA ) { | |
|     ... | |
|     if( pcm_flag[ x0 ][ y0 ] ) { | |
|       ... | |
|     } else { | |
|       if( treeType == SINGLE_TREE \|\| treeType == DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] == 0) | |
|           intra_luma_angular_mode_flag[ x0 ][ y0 ] | ae(v) |
|           if (intra_luma_angular_mode_flag[ x0 ][ y0 ] == 0) | |
|             intra_luma_planar_flag[ x0 ][ y0 ] | ae(v) |
|         if (intra_luma_ref_idx[ x0 ][ y0 ] != 0 \|\| intra_luma_angular_mode_flag[ x0 ][ y0 ] != 0) { | |
|           intra_luma_mpm_flag[ x0 ][ y0 ] | ae(v) |
|           if( intra_luma_mpm_flag[ x0 ][ y0 ] ) | |
|             intra_luma_mpm_idx[ x0 ][ y0 ] | ae(v) |
|           else | |
|             intra_luma_mpm_remainder[ x0 ][ y0 ] | ae(v) |
|         } | |
|       } | |
|       if( treeType == SINGLE_TREE \|\| treeType == DUAL_TREE_CHROMA ) | |
|         intra_chroma_pred_mode[ x0 ][ y0 ] | ae(v) |
|     } | |
|   ... | |
|   if( mmvd_flag[ x0 ][ y0 ] == 0 && merge_subblock_flag[ x0 ][ y0 ] == 0 && ( cbWidth * cbHeight ) >= 64 && cbWidth < 128 && cbHeight < 128 ) { | |
|     mh_intra_flag[ x0 ][ y0 ] | ae(v) |

TABLE 8A-continued

| | Descriptor |
|---|---|
| ```
if( mh_intra_flag[ x0 ][ y0 ] ) {
        intra_luma_angular_mode_flag[ x0 ][ y0 ]
        if( intra_angular_mode_flag[ x0 ][ y0 ] )
            mh_intra_luma_vert_flag[ x0 ][ y0 ]
        else
            intra_luma_planar_flag[ x0 ][ y0 ]
    }
}
``` | ae(v)<br><br>ae(v)<br><br>ae(v) |

With respect to Table 8A, the definitions of syntax elements may be based on those provided above, and as follows:

intra_luma_angular_mode_flag[x0][y0] equal to 1 specifies that the intra prediction mode for luma samples is angular, intra_luma_angular_mode_flag[x0][y0] equal to 0 specifies that the intra prediction mode for luma samples is not angular. When intra_luma_angular_mode_flag[x0][y0] is not present it is inferred to be equal to 1.

intra_luma_planar_flag[x0][y0] equal to 1 specifies that the intra prediction mode for luma samples is PLANAR. intra_luma_planar_flag[x0][y0] equal to 0 specifies that the intra prediction mode for luma samples is DC. When intra_luma_planar_flag[x0][y0] is not present it is inferred to be equal to 1.

When mh_intra_flag[x0][y0] is equal to 0, the syntax elements intra_luma_mpm_flag[x0][y0], intra_luma_mpm_idx[x0][y0] and intra_luma_mpm_remainder[x0][y0] specify the angular intra prediction mode for luma samples. The array indices x0, y0 specify the location (x0, y0) of the top-left luma sample of the considered coding block relative to the top-left luma sample of the picture. When intra_luma_angular_mode_flag[x0][y0] is equal to 1 and intra_luma_mpm_flag[x0][y0] is equal to 1, the intra prediction mode is inferred from a neighbouring intra-predicted coding unit as provided above.

mh_intra_luma_vert_flag[x0][y0] equal to 1 specifies that the intra prediction mode for luma samples is INTRA_ANGULAR50. mh_intra_luma_vert_flag[x0][y0] equal to 0 specifies that the intra prediction mode for luma samples is INTRA_ANGULAR18. When intra_luma_vert_flag[x0][y0] is not present it is inferred to be equal to 0.

When mh_intra_flag[x0][y0] is equal to 1, the syntax elements intra_luma_angular_mode_flag[x0][y0], mh_intra_luma_vert_flag[x0][y0], and intra_luma_planar_flag[x0][y0] specify the intra prediction mode for luma samples used in combined inter-picture merge and intra-picture prediction. The array indices x0, y0 specify the location (x0, y0) of the top-left luma sample of the considered coding block relative to the top-left luma sample of the picture. The intra prediction mode IntraPredModeY is derived as follows:

```
if ( intra_angular_mode_flag[ x0 ][ y0 ] != 0 ) {
    IntraPredModeY = ( mh_intra_luma_vert_flag[ x0 ][ y0 ] )? INTRA_ANGULAR50 : INTRA_ANGULAR18
}else{
    IntraPredModeY = ( intra_luma_planar_flag[ x0 ][ y0 ] )? INTRA_PLANAR : INTRA_DC
}
```

With respect to Table 8A, the process for inferring a intra prediction mode from a neighbouring intra-predicted coding unit may be as follows:

Input to this process are:
- a luma location (xCb, yCb) specifying the top-left sample of the current luma coding block relative to the top-left luma sample of the current picture,
- a variable cbWidth specifying the width of the current coding block in luma samples,
- a variable cbHeight specifying the height of the current coding block in luma samples.

In this process, the luma intra prediction mode IntraPredModeY[xCb][yCb] is derived.

Table 3 specifies the value for the intra prediction mode IntraPredModeY[xCb][yCb] and the associated names.

IntraPredModeY[xCb][yCb] is derived by the following ordered steps:

1. The neighbouring locations (xNbA, yNbA) and (xNbB, yNbB) are set equal to (xCb−1, yCb+cbHeight−1) and (xCb+cbWidth−1, yCb−1), respectively.

2. For X being replaced by either A or B, the variables candIntraPredModeX are derived as follows:

The availability derivation process for a block is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX is derived as follows:

If one or more of the following conditions are true, candIntraPredModeX is set equal to INTRA_PLANAR.
   - The variable availableX is equal to FALSE.
   - CuPredMode[xNbX][yNbX] is not equal to MODE_INTRA and mh_intra_flag[xNbX][yNbX] is not equal to 1.
   - pcm_flag[xNbX][yNbX] is equal to 1.
   - X is equal to B and yCb−1 is less than ((yCb>>Ctb Log 2SizeY)<<Ctb Log 2SizeY).

Otherwise, candIntraPredModeX is set equal to IntraPredIodeY[xNbX][yNbX].

3. The candModeList[x] with x=0 . . . 5 is derived as follows:

If candIntraPredModeB is equal to candIntraPredModeA and candIntraPredModeA is greater than INTRA_DC, candModeList[x] with x=0 . . . 5 is derived as follows:
   the following applies:
   candModeList[0]=candIntraPredModeA
   candModeList[1]=2+((candIntraPredModeA+61)% 64)
   candModeList[2]=2+((candIntraPredModeA−1)% 64)
   candModeList[3]=2+((candIntraPredModeA+60)% 64)
   candModeList[4]=2+(candIntraPredModeA % 64)
   candModeList[5]=2+((candIntraPredModeA+59)% 64)

Otherwise if candIntraPredModeB is not equal to candIntraPredModeA and candIntraPredModeA or candIntraPredModeB is greater than INTRA_DC, the following applies:

The variables minAB and maxAB are derived as follows:
   minAB=Min(candIntraPredModeA, candIntraPredModeB)
   maxAB=Max(candIntraPredModeA, candIntraPredModeB)

If candIntraPredModeA and candIntraPredModeB are both greater than INTRA_DC, candModeList[x] with x=0 . . . 5 is derived as follows:
   candModeList[0]=candIntraPredModeA
   candModeList[1]=candIntraPredModeB
   the following applies:
   If maxAB−minAB is equal to 1, the following applies:
   candModeList[2]=2+((minAB+61)% 64)
   candModeList[3]=2+((maxAB−1)% 64)
   candModeList[4]=2+((minAB+60)% 64)
   candModeList[5]=2+(maxAB % 64)
   Otherwise if maxAB−minAB is equal to 2, the following applies:
   candModeList[2]=2+((minAB−1)% 64)
   candModeList[3]=2+((minAB+61)% 64)
   candModeList[4]=2+((maxAB−1)% 64)
   candModeList[5]=2+((minAB+60)% 64)
   Otherwise if maxAB−minAB is greater than 61, the following applies:
   candModeList[2]=2+((minAB−1)% 64)
   candModeList[3]=2+((maxAB+61)% 64)
   candModeList[4]=2+(minAB % 64)
   candModeList[5]=2+((maxAB+60)% 64)
   Otherwise, the following applies:
   candModeList[2]=2+((minAB+61)% 64)
   candModeList[3]=2+((minAB−1)% 64)
   candModeList[4]=2+((maxAB+61)% 64)
   candModeList[5]=2+((maxAB−1)% 64)

Otherwise (candIntraPredModeA or candIntraPredModeB is greater than INTRA_DC), candModeList[x] with x=0 . . . 5 is derived as follows:
   the following applies:
   candModeList[0]=maxAB
   candModeList[1]=2+((maxAB+61)% 64)
   candModeList[2]=2+((maxAB−1)% 64)
   candModeList[3]=2+((maxAB+60)% 64)
   candModeList[4]=2+(maxAB % 64)
   candModeList[5]=2+((maxAB+59)% 64)

Otherwise, the following applies:
   the following applies:
   candModeList[0]=INTRA_ANGULAR50
   candModeList[1]=INTRA_ANGULAR18
   candModeList[2]=INTRA_ANGULAR2
   candModeList[3]=INTRA_ANGULAR34
   candModeList[4]=INTRA_ANGULAR66
   candModeList[5]=INTRA_ANGULAR26

4. IntraPredModeY[xCb][yCb] is derived by applying the following procedure:

If intra_luma_mpm_flag[xCb][yCb] is equal to 1, the IntraPredModeY[xCb][yCb] is set equal to candModeList[intra_luma_mpm_idx[xCb][yCb]].

Otherwise, IntraPredModeY[xCb][yCb] is derived by applying the following ordered steps:

1. When candModeList[i] is greater than candModeList[j] for i=0 . . . 4 and for each i, j=(i+1) . . . 5, both values are swapped as follows:
   (candModeList[i], candModeList[j])=Swap(candModeList[i], candModeList[j])

2. IntraPredModeY[xCb][yCb] is derived by the following ordered steps:
   i. IntraPredModeY[xCb][yCb] is set equal to (intra_luma_mpm_remainder[xCb][yCb]+2).
   ii. For i equal to 0 to 5, inclusive, when IntraPredModeY[xCb][yCb] is greater than or equal to candModeList[i], the value of IntraPredModeY [xCb][yCb] is incremented by one.

The variable IntraPredModeY[x][y] with x=xCb . . . xCb+cbWidth−1 and y=yCb . . . yCb+cbHeight−1 is set to be equal to IntraPredModeY[xCb][yCb].

With respect to Table 7, in some cases, entropy coding performance may be improved by grouping bypass bins. Table 9 illustrates an example of syntax where bypass bins are grouped.

TABLE 9

| | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|   ... | |
|   } else { | |
|     if( treeType = = SINGLE_TREE || treeType = = DUAL_TREE_LUMA ) { | |
|       for( j = 0; j < cbHeight; j = j + pbHeight ) | |
|         for( i = 0; i < cbWidth; i = i + pbWidth ) | |
|           if( ( ( y0 + j ) % CtbSizeY ) > 0 ) | |
|             intra_luma_ref_idx[ x0 + i ][ y0 + j ] | ae(v) |
|       for( j = 0; j < cbHeight; j = j + pbHeight ) | |
|         for( i = 0; i < cbWidth; i = i + pbWidth ) | |
|           if (intra_luma_ref_idx[ x0 + i ][ y0 + j ] = = 0) | |
|             intra_luma_angular_mode_flag[ x0 + i ][ y0 + j ] | ae(v) |
|       for( j = 0; j < cbHeight; j = j + pbHeight ) | |
|         for( i = 0; i < cbWidth; i = i + pbWidth ) | |
|           if (intra_luma_ref_idx[ x0 + i ][ y0 + j ] = = 0 && intra_luma_angular_mode_flag[ x + i ][ y0 + j ] = = 0) | |
|             intra_luma_planar_flag[ x0 + i ][ y0 + j ] | ae(v) |
|       for( j = 0; j < cbHeight; j = j + pbHeight ) | |
|         for( i = 0; i < cbWidth; i = i + pbWidth ) | |
|           if (intra_luma_ref_idx[ x0 + i ][ y0 + j ] != 0 || intra_luma_angular_mode_flag[ x0 + i ][ y0 + j ] != 0) | |
|             intra_luma_mpm_flag[ x0 + i ][ y0 + j ] | ae(v) |
|       for( j = 0; j < cbHeight; j = j + pbHeight ) | |
|         for( i = 0; i < cbWidth; i = i + pbWidth ) | |
|           if( intra_luma_mpm_flag[ x0 + i ][ y0 + j ] ) | |
|             intra_luma_mpm_idx[ x0 + i ][ y0 + j ] // bypass | ae(v) |
|           else | |
|             intra_luma_mpm_remainder[ x0 + i ][ y0 + j ] // bypass | ae(v) |
|     } | |
|     if( treeType = = SINGLE_TREE || treeType = = DUAL_TREE_CHROMA ) | |
|     ... | |
|   } | |

Similarly, with respect to Table 1, entropy coding performance may be improved by grouping bypass bins. Table 10 illustrates an example of syntax where bypass bins are grouped.

TABLE 10

| | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|   ... | |
|   } else { | |
|     if( treeType = = SINGLE_TREE || treeType = = DUAL_TREE_LUMA ) | |
| { | |
|       for( j = 0; j < cbHeight; j = j + pbHeight ) | |
|         for( i = 0; i < cbWidth; i = i + pbWidth ) | |
|           if( ( ( y0 + j ) % CtbSizeY ) > 0 ) | |
|             intra_luma_ref_idx[ x0 + i ][ y0 + j ] | ae(v) |

TABLE 10-continued

| | Descriptor |
|---|---|
| ` for( j = 0; j < cbHeight; j = j + pbHeight )`<br>` for( i = 0; i < cbWidth; i = i + pbWidth )`<br>` if (intra_luma_ref_idx[ x0 + i ][ y0 + j ] = = 0)`<br>` intra_luma_mpm_flag[ x0 + i ][ y0 + j ]` | ae(v) |
| ` for( j = 0; j < cbHeight; j = j + pbHeight )`<br>` for( i = 0; i < cbWidth; i = i + pbWidth ) {`<br>` if( intra_luma_mpm_flag[ x0 + i ][ y0 + j ] )`<br>` intra_luma_mpm_idx[ x0 + i ][ y0 + j ] // bypass` | ae(v) |
| ` else`<br>` intra_luma_mpm_remainder[ x0 + i ][ y0 + j ] // bypass` | ae(v) |
| ` }`<br>` if( treeType = = SINGLE_TREE || treeType = = DUAL_TREE_CHROMA )`<br>`...`<br>` }`<br>`...` | |

Further, in one example, syntax elements intra_luma_angular_mode_flag, and intra_luma_planar_flag may be grouped in the same loop as illustrated in Table 11.

TABLE 11

| | |
|---|---|
| ` for( j = 0; j < cbHeight; j = j + pbHeight )`<br>` for( i = 0; i < cbWidth; i = i + pbWidth ) {`<br>` if (intra_luma_ref_idx[ x0 + i ][ y0 + j ] = = 0)`<br>` intra_luma_angular_mode_flag[ x0 + i ][ y0 + j ]` | ae(v) |
| ` if (intra_luma_ref_idx[ x0 + i ][ y0 + j ] = = 0 && intra_luma_angular_mode_flag[ x + i ][ y0 + j ] = = 0)`<br>` intra_luma_planar_flag [ x0 + i ][ y0 + j ]` | ae(v) |
| ` }` | |

Further, in one example, syntax elements mh_intra_luma_angular_mode_flag, and mh_intra_luma_planar_flag may be grouped in the same loop as illustrated in Table 12.

TABLE 12

| | |
|---|---|
| `for( j = 0; j < cbHeight; j = j + pbHeight )`<br>` for( i = 0; i < cbWidth; i = i + pbWidth ) {`<br>` mh_intra_flag[ x0 + i ][ y0 + j ]` | ae(v) |
| `for( j = 0; j < cbHeight; j = j + pbHeight )`<br>` for( i = 0; i < cbWidth; i = i + pbWidth ) {`<br>` if( mh_intra_flag[ x0 ][ y0 ] ) {`<br>` mh_intra_luma_angular_mode_flag[ x0 ][ y0 ]` | ae(v) |
| ` if( mh_intra_angular_mode_flag[ x0 ][ y0 ] == 0 )`<br>` mh_intra_luma_planar_flag[ x0 ][ y0 ]` | ae(v) |
| ` }`<br>`for( j = 0; j < cbHeight; j = j + pbHeight)`<br>` for( i = 0; i < cbWidth; i = i + pbWidth ) {`<br>` if( mh_intra_angular_mode_flag[ x0 ][ y0 ] != 0 )`<br>` mh_intra_luma_vert_flag[ x0 ][ y0 ] // no MPM list needed` | ae(v) |

With respect to the syntax elements illustrated in Tables 7-12, in general, the contexts of bins may be: fixed, selected from a set based on luma intra prediction mode of neighboring blocks, selected from a set based on size of the luma block, selected from a set based on CU size (avoids need of storage line buffer for neighborhood), and/or selected from a set based on tree depth (avoids need of storage line buffer for neighborhood). It should be noted that when selecting from a set based on neighboring blocks data from the CTU above may not be used to avoid use of a line buffer.

In one example, intra_luma_angular_mode_flag may be coded using one context. Further, in one example, intra_luma_angular_mode_flag may be coded using a set of contexts. For example, the context may selected based on intra modes used for neighboring blocks. For example, as follows:

```
unsigned DeriveCtx::CtxAngularFlag( const PredictionUnit& pu )
{
    const CompArea &area = pu.block(getFirstComponentOfChannel(CH_L));
    unsigned ctxId = 0;
#if !CHANGE_5_CTXTS_TO_3
    const PredictionUnit *puLeft = pu.cs->getPURestricted( area.topLeft( ).offset( -1, 0 ), pu, CH_L);
    ctxId += ( puLeft && CU::isIntra( *puLeft->cu ) && puLeft->intraDir[CH_L] > DC_IDX ) ? 1 : 0;
    const PredictionUnit *puAbove = pu.cs->getPURestricted( area.topLeft( ).offset( 0, -1 ), pu, CH_L );
    ctxId += ( puAbove && CU::isIntra( *puAbove->cu ) && puAbove->intraDir[CH_L] > DC_IDX ) ? 1 : 0;
#endif
    const PredictionUnit *puLeftBottom = pu.cs->getPURestricted( area.bottomLeft( ).offset(-1, 0), pu, CH_L );
    ctxId += ( puLeftBottom && CU::isIntra( *puLeftBottom->cu ) && puLeftBottom->intraDir[CH_L] > DC_IDX ) ? 1 : 0;
    const PredictionUnit *puAboveRight = pu.cs->getPURestricted( area.topRight( ).offset(0, -1), pu, CH_L) ;
    ctxId += ( puAboveRight && CU::isIntra( *puAboveRight->cu ) && puAboveRight->intraDir[CH_L] > DC_IDX ) ? 1 : 0;
    return ctxId;
}
// COMMENTS:
// intraDir > DC_IDX implies angular intra prediction mode
// number of contexts above may be 5 or 4 based on value of macro CHANGE_5_CTXTS_TO_3
```

In one example, the data from a CTU above current CTU is not used to avoid a line buffer. In this case, the context may be selected, e.g., as follows:

```
unsigned DeriveCtx::CtxAngularFlag( const PredictionUnit& pu )
{
    const CompArea &area = pu.block(getFirstComponentOfChannel(CH_L));
    unsigned ctxId = 0;
#if !CHANGE_4_CTXTS_TO_2
    const PredictionUnit *puLeft = pu.cs->getPURestricted( area.topLeft( ).offset( -1, 0 ), pu, CH_L );
    ctxId += ( puLeft && CU::isIntra( *puLeft->cu ) && puLeft->intraDir[CH_L] > DC_IDX ) ? 1 : 0;
    const PredictionUnit *puAbove = pu.cs->getPURestricted( area,topLeft( ).offset( 0, -1 ), pu, CH_L );
    ctxId += ( puAbove && CU::isIntra( *puAbove->cu ) && CU::isSameCtu(*pu.cu, *puAbove->cu) && puAbove->intraDir[CH_L] > DC_IDX ) ? 1 : 0;
#endif
    const PredictionUnit *puLeftBottom = pu.cs->getPURestricted( area.bottomLeft( ).offset(-1, 0), pu, CH_L );
    ctxId += ( puLeftBottom && CU::isIntra( *puLeftBottom->cu ) && puLeftBottom->intraDir[CH_L] > DC_IDX ) ? 1 : 0;
    const PredictionUnit *puAboveRight = pu.cs->getPURestricted( area.topRight( ).offset(0, -1), pu, CH_L) ;
    ctxId += ( puAboveRight && CU::isIntra( *puAboveRight->cu ) && CU::isSameCtu(*pu.cu, *puAboveRight->cu) && puAboveRight->intraDir[CH_L] > DC_IDX ) ? 1 : 0;
    return ctxId;
}
// COMMENTS:
// intraDir > DC_IDX implies angular intra prediction mode
// number of contexts above may be 5 or 4 based on value of macro CHANGE_5_CTXTS_TO_3
```

Further, in one example, the context of intra_luma_angular_mode_flag may derived as follows:
When mh_intra_flag[ ][ ] is equal to 1, ctxInc is (cbWidth>2*cbHeight||cbHeight>2*cbWidth)? 5:6
When mh_intra_flag[ ][ ] is equal to 0, ctxInc is between 0 . . . 4 and derived as follows:
Input to this process is the luma location (x0, y0) specifying the top-left luma sample of the current luma block relative to the top-left sample of the current picture, the colour component cIdx, the current coding quadtree depth cqDepth, and the width and the height of the current coding block in luma samples cbWidth and cbHeight.
Output of this process is ctxInc.
The availability derivation process for a block is invoked with the location (xCurr, yCurr) set equal to (x0, y0) and the neighbouring location (xNbY, yNbY) set equal to (x0−1, y0) as inputs, and the output is assigned to availableL.
The availability derivation process for a block is invoked with the location (xCurr, yCurr) set equal to (x, y0) and the neighbouring location (xNbY, yNbY) set equal to (x−1, y0+cbHeight−1) as inputs, and the output is assigned to availableLB.
The availability derivation process for a block is invoked with the location (xCurr, yCurr) set equal to (x0, y0) and the neighbouring location (xNbY, yNbY) set equal to (x0, y0−1) as inputs, and the output is assigned to availableA.
The availability derivation process for a block is invoked with the location (xCurr, yCurr) set equal to (x0, y0) and the neighbouring location (xNbY, yNbY) set equal to (x0+cbWidth−1, y0−1) as inputs, and the output is assigned to availableAR.
The same CTU checking process for a block is invoked with the location (xCurr, yCurr) set equal to (x0, y0) and the neighbouring location (xNbY, yNbY) set equal to (x0, y0−1) as inputs, and the output is assigned to sameCtuA.
The same CTU checking process for a block is invoked with the location (xCurr, yCurr) set equal to (x, y0) and the neighbouring location (xNbY, yNbY) set equal to (x0+cbWidth−1, y0−1) as inputs, and the output is assigned to sameCtuAR.
The assignment of ctxInc is specified as follows with condL, condLB, condA and condAR for the syntax elements intra_luma_angular_mode_flag[x0][y0] specified in Table 13:
ctxInc=(condL && availableL)+(condLB && availableLB)+(condA && availableA && sameCtuA)+ (condAR && availableAR && sameCtuAR)

In one example, a CTU checking process may be as follows:
Inputs to this process are:
Luma location (xCurr, yCurr) specifying the top-left sample of the current coding/prediction block relative to the top-left luma sample of the current picture,
Luma location (xNbY, yNbY)
Output of this process is:
Variable sameCtu
Derive CtbAddrCurr, specifying a CTB address in CTB raster scan of a picture that includes luma sample at location (xCurr, yCurr).
Derive CtbAddrNb, specifying a CTB address in CTB raster scan of a picture that includes luma sample at location (xNbY, yNbY).
When CtbAddrCurr is equal to CtbAddrNb assign true to variable sameCtu, Otherwise assign false to variable sameCtu In one example, intra_luma_planar_flag may be coded using one context. Further, in one example, intra_luma_planar_flag may be coded using a set of contexts. For example, the context may selected based on intra modes used for neighboring blocks.

In one example, mh_intra_luma_angular_mode_flag may be coded using a set of contexts. For example, the context may selected based on the size of the block (PU) and for example from a set of 3 context, for example, as follows:

```
int PU::getNarrowShape(const int width, const int height)
{
    int longSide = (width > height) ? width : height;
    int shortSide = (width > height) ? height : width;
    if (longSide > (2 * shortSide))
    {
        if (longSide == width)
            return 1;
        else
            return 2;
    }
    else
    {
        return 0;
    }
}
```

In one example, a context index for context coding mh_intra_luma_angular_mode_flag may be determined as:
PU::getNarrowShape(pu→lwidth( ), pu→lheight( ))? 0:1)
In one example, mh_intra_luma_vert_flag may be bypass coded.
In one example, mh_intra_luma_planar_flag may be context coded using one context. In one example, mh_intra_lu-

TABLE 13

| Syntax element | condL | condLB | condA | condAR |
|---|---|---|---|---|
| intra_luma_angular_mode_flag[ x0 ][ y0 ] | CuPredMode[ xNbL ][ yNbL ] is equal to MODE_INTRA && intra_luma_angular_mode_flag[ xNbL ][ yNbL ] is equal to 1 | CuPredMode[ xNbLB ][ yNbLB ] is equal to MODE_INTRA && intra_luma_angular_mode_flag[ xNbLB ][ yNbLB ] is equal to 1 | CuPredMode[ xNbA ][ yNbA ] is equal to MODE_INTRA && intra_luma_angular_mode_flag[ xNbA ][ yNbA ] is equal to 1 | CuPredMode[ xNbAR ][ yNbAR ] is equal to MODE_INTRA && intra_luma_angular_mode_flag[ xNbAR ][ yNbAR ] is equal to 1 | ma_planar_flag may be context coded by selecting one context from a set of contexts based on neighboring intra modes.

In one example, the binarization of intra_luma_mpm_remainder may use a truncated binary (TB) binarization process with cMax=NUM_LUMA_MODE (67)−NUM_MOST_PROBABLE_MODES (6)−3=58.

Figure 7A:
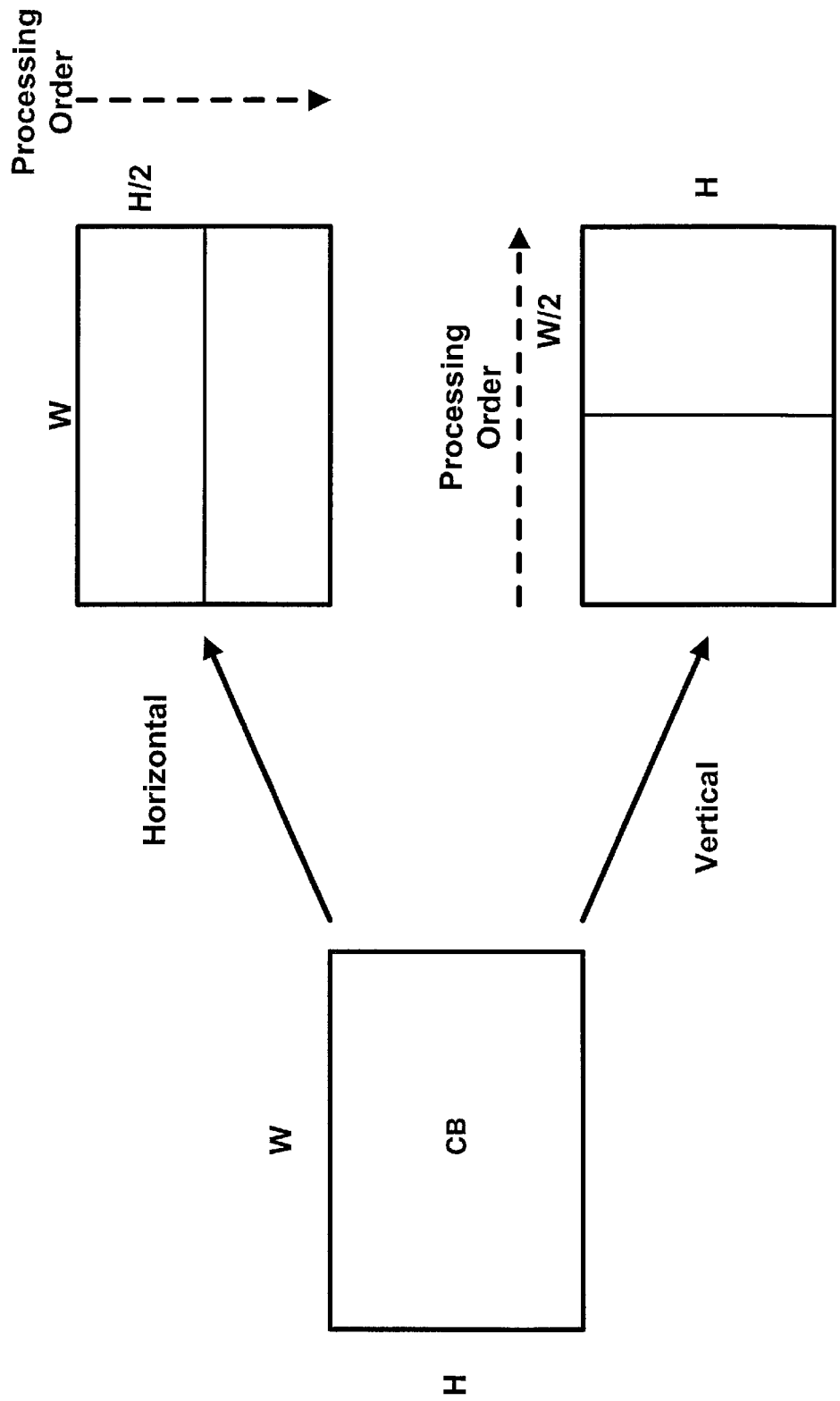
FIG. 7A is a conceptual diagram illustrating blocks of video data divided into intra sub-partitions in accordance with one or more techniques of this disclosure.
Figure 7B:
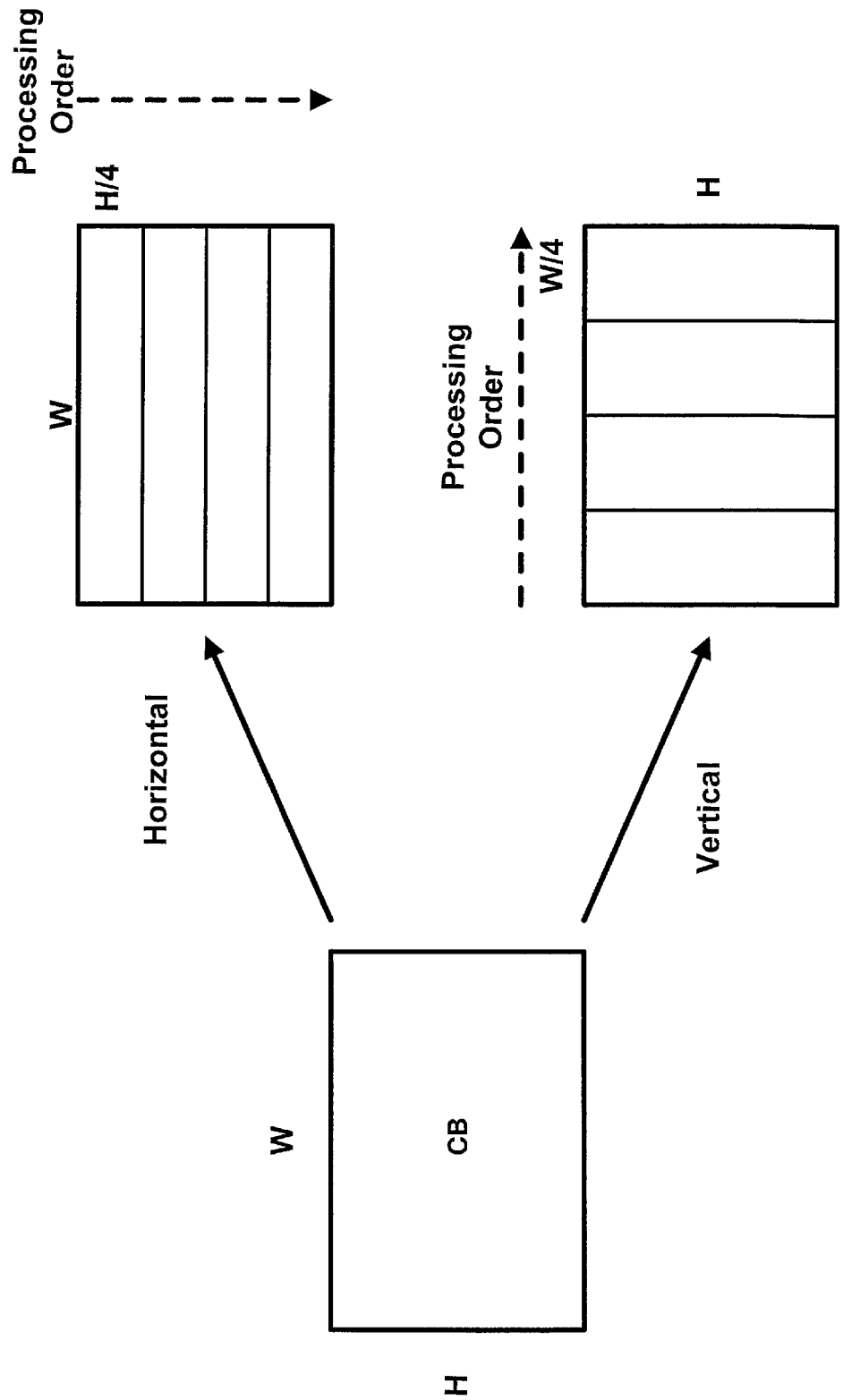
FIG. 7B is a conceptual diagram illustrating blocks of video data divided into intra sub-partitions in accordance with one or more techniques of this disclosure.

In JVET-M1001, a so-called Intra Sub-Partitions (ISP) coding mode may be used for intra prediction. For the ISP coding mode in JVET-M1001, some luma intra-predicted blocks (i.e., luma CBs) are further divided vertically or horizontally into two or four sub-partitions depending on the block size dimensions. FIG. 7A illustrates an example of the division of blocks, e.g., 4×8 and 8×4 block, into two sub-partitions according to the ISP coding mode in JVET-M1001. FIG. 7B illustrates the example of the division of blocks into four sub-partitions according to the ISP coding mode in JVET-M1001. It should be noted that according to the ISP coding mode in JVET-M1001 all sub-partitions are required to fulfill the condition of having at least 16 samples. In JVET-M1001, each of the sub-partitions in the luma intra-predicted block share the same intra prediction mode. Further, FIGS. 7A-7B illustrate the processing order of the sub-partitions according to JVET-M1001. That is, as illustrated in FIGS. 7A-7B, sub-partitions generated by a horizontal division are processed from top-to-bottom and sub-partitions generated by a vertical division are processed from left-to-right. It should be noted that such a processing order may be referred to as a normal processing order and a reverse processing order may refer to processing sub-partitions generated by a horizontal division from bottom-to-top and processing sub-partitions generated by a vertical division from right to left.

For each of the sub-partitions in the luma intra-predicted block, at a video encoder, a residual is generated, and at a video decoder, a reconstructed video block is generated, according to the processing order. That is, for each preceding sub-partition is reconstructed before the subsequent sub-partition. Therefore, the reconstructed values of each preceding sub-partition will be available and are used to generate the prediction of the subsequent sub-partition. That is, according to the normal processing order, reference samples used to generate sub-partition predictions are only located at the left and above a sub-partition. Further, it should be noted that each sub-partition has a corresponding residual that is independent of the residual of the other sub-partitions. That is, each sub-partition, at a video decoder, a residual is generated by inverse quantizing and performing an inverse transform on a set of level values that correspond to a sub-partition. Thus, each of the sub-partitions may be said to have a corresponding transform block and each of the sub-partition boundaries may be said to form transform block edges.

Table 14 illustrates the revelation portion of the coding unit syntax for enabling the ISP coding mode in JVET-M1001.

TABLE 14

| | Descriptor |
|---|---|
| coding_unit( x0, y0, cbWidth, cbHeight, treeType ) { | |
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|   ... | |
|   } else { | |
|     if( treeType = = SINGLE_TREE || treeType = = DUAL_TREE_LUMA ) | |
| { | |
|       if( ( y0% CtbSizeY ) > 0 ) | |
|         intra_luma_ref_idx[ x0 ][ y0 ] | ae(v) |
|       if (intra_luma_ref_idx[ x0 ][ y0 ] = = 0 && | |
|         ( cbWidth <= MaxTbSizeY || cbHeight <= MaxTbSizeY ) && | |
|         ( cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] = = 1 && | |
|         cbWidth <= MaxTbSizeY && cbHeight <= MaxTbSizeY ) | |
|         intra_subpartitions_split_flag[ x0 ][ y0 ] | ae(v) |
|       if( intra_luma_ref_idx[ x0 ][ y0 ] = = 0 && | |
|         intra_subpartitions_mode_flag[ x0 ][ y0 ] = = 0 ) | |
|         intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE || treeType = = DUAL_TREE_CHROMA ) | |
|       intra_chroma_pred_mode[ x0 ][ y0 ] | ae(v) |
|   } | |
|   } else if( treeType != DUAL_TREE_CHROMA ) { /* MODE_INTER */ | |
|     if( cu_skip_flag[ x0 ][ y0 ] = = 0 ) | |

TABLE 14-continued

| | Descriptor |
|---|---|
| merge_flag[ x0 ][ y0 ] | ae(v) |
| if( merge_flag[ x0 ][ y0 ] ) { | |
|     merge_data( x0, y0, cbWidth, cbHeight ) | |
| } else { | |
| ... | |
|     if( CuPredMode[ x0 ][ y0 ] != MODE_INTRA && merge_flag[ x0 ][ y0 ] = = 0 ) | |
|         cu_cbf | ae(v) |
| ... | |

With respect to Table 14, for syntax elements cu_skip_flag, pred_mode_flag, intra_luma_ref_idx, intra_luma_mpm_flag, intra_luma_mpm_idx, intra_luma_mpm_remainder, intra_chroma_pred_mode, merge_flag, and cu_cbf JVET-M1001 provides the definitions as provided above with respect to Table 1. For syntax elements intra_subpartitions_mode_flag, intra_subpartitions_split_flag, JVET-M1001 the following semantics:

intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_split_flag[x0][y0] specifies whether the intra subpartitions split type is horizontal or vertical. When intra_subpartitions_split_flag[x0][y0] is not present, it is inferred as follows:
  If cbHeight is greater than MaxTbSizeY, intra_subpartitions_split_flag[x0][y0] is inferred to be equal to 0.
  Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 15. IntraSubPartitionsSplitType is derived as follows:
  If intra_subpartitions_mode_flag[x0][y0] is equal to 0, IntraSubPartitionsSplitType is set equal to 0.
  Otherwise, the IntraSubPartitionsSplitType is set equal to 1+intra_subpartitions_split_flag[x0][y0].

TABLE 15

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block sub-partitions an intra luma coding block is divided into. NumIntraSubPartitions is derived as follows:
  If IntraSubPartitionsSplitType is equal to ISP_NO_SPLIT, NumIntraSubPartitions is set equal to 1.
  Otherwise, if one of the following conditions is true, NumIntraSubPartitions is set equal to 2:
    cbWidth is equal to 4 and cbHeight is equal to 8,
    cbWidth is equal to 8 and cbHeight is equal to 4.
  Otherwise, NumIntraSubPartitions is set equal to 4.

With respect to a process for inferring a intra prediction mode from a neighbouring intra-predicted coding unit, JVET-M1001 provides the following:
Input to this process are:
  a luma location (xCb, yCb) specifying the top-left sample of the current luma coding block relative to the top-left luma sample of the current picture,
  a variable cbWidth specifying the width of the current coding block in luma samples,
  a variable cbHeight specifying the height of the current coding block in luma samples.
In this process, the luma intra prediction mode IntraPredModeY[xCb][yCb] is derived.
Table 3, provided above, specifies the value for the intra prediction mode IntraPredModeY[xCb][yCb] and the associated names.
IntraPredModeY[xCb][yCb] is derived by the following ordered steps:
1. The neighbouring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:
  The availability derivation process for a block as specified is invoked with the location (xCurr, yCurr) set equal to (xCb, yCb) and the neighbouring location (xNbY, yNbY) set equal to (xNbX, yNbX) as inputs, and the output is assigned to availableX.
  The candidate intra prediction mode candIntraPredModeX is derived as follows:
    If one or more of the following conditions are true, candIntraPredModeX is set equal to INTRA_PLANAR.
      The variable availableX is equal to FALSE.
      CuPredMode[xNbX][yNbX] is not equal to MODE_INTRA and ciip_flag[xNbX][yNbX] is not equal to 1.
      pcm_flag[xNbX][yNbX] is equal to 1.
      X is equal to B and yCb−1 is less than ((yCb>>Ctb Log 2SizeY)<<Ctb Log 2SizeY).
    Otherwise, candIntraPredModeX is set equal to IntraPredModeY[xNbX][yNbX].
3. The variables ispDefaultMode1 and ispDefaultMode2 are defined as follows:
  If IntraSubPartitionsSplitType is equal to ISP_HOR_SPLIT, ispDefaultMode1 is set equal to INTRA_ANGULAR18 and ispDefaultMode2 is set equal to INTRA_ANGULAR5.
  Otherwise, ispDefaultMode1 is set equal to INTRA_ANGULAR50 and ispDefaultMode2 is set equal to INTRA_ANGULAR63.

4. The candModeList[x] with x=0 . . . 5 is derived as follows:
   If candIntraPredModeB is equal to candIntraPredModeA and candIntraPredModeA is greater than INTRA_DC, candModeList[x] with x=0 . . . 5 is derived as follows:
      If IntraLumaRefLineIdx[xCb][yCb] is equal to 0 and IntraSubPartitionsSplitType is equal to ISP_ NO_SPLIT, the following applies:
         candModeList[0]=candIntraPredModeA
         candModeList[1]=INTRA_PLANAR
         candModeList[2]=INTRA_DC
         candModeList[3]=2+((candIntraPredModeA+61)% 64)
         candModeList[4]=2+((candIntraPredModeA-1)% 64)
         candModeList[5]=2+((candIntraPredModeA+60)% 64)
      Otherwise (IntraLumaRefLineIdx[xCb][yCb] is not equal to 0 or IntraSubPartitionsSplitType is not equal to ISP_NO_SPLIT), the following applies:
         candModeList[0]=candIntraPredModeA
         candModeList[1]=2+((candIntraPredModeA+61)% 64)
         candModeList[2]=2+((candIntraPredModeA-1)% 64)
         If one of the following conditions is true,
            IntraSubPartitionsSplitType is equal to ISP_HOR_SPLIT and candIntraPredModeA is less than INTRA_ANGULAR34,
            IntraSubPartitionsSplitType is equal to ISP_VER_SPLIT and candIntraPredModeA is greater than or equal to INTRA_ANGULAR34,
            IntraLumaRefLineIdx[xCb][yCb] is not equal to 0, the following applies:
            candModeList[3]=2+((candIntraPredModeA+60)% 64)
            candModeList[4]=2+(candIntraPredModeA % 64)
            candModeList[5]=2+((candIntraPredModeA+59)% 64)
         Otherwise, the following applies:
            candModeList[3]=ispDefaultMode1
            candModeList[4]=ispDefaultMode2
            candModeList[5]=INTRA_PLANAR
   Otherwise if candIntraPredModeB is not equal to candIntraPredModeA and candIntraPredModeA or candIntraPredModeB is greater than INTRA_DC, the following applies:
      The variables minAB and maxAB are derived as follows:
         minAB=Min(candIntraPredModeA, candIntraPredModeB)
         maxAB=Max(candIntraPredModeA, candIntraPredModeB)
      If candIntraPredModeA and candIntraPredModeB are both greater than INTRA_DC, candModeList[x] with x=0 . . . 5 is derived as follows:
         candModeList[0]=candIntraPredModeA
         candModeList[1]=candIntraPredModeB
         If IntraLumaRefLineIdx[xCb][yCb] is equal to 0 and IntraSubPartitionsSplitType is equal to ISP_NO_SPLIT, the following applies:
            candModeList[2]=INTRA_PLANAR
            candModeList[3]=INTRA_DC
            If maxAB-minAB is in the range of 2 to 62, inclusive, the following applies:
               candModeList[4]=2+((maxAB+61)% 64)
               candModeList[5]=2+((maxAB-1)% 64)
            Otherwise, the following applies:
               candModeList[4]=2+((maxAB+60)% 64)
               candModeList[5]=2+((maxAB) % 64)
         Otherwise (IntraLumaRefLineIdx[xCb][yCb] is not equal to 0 or IntraSubPartitionsSplitType is not equal to ISP_NO_SPLIT), the following applies:
            When IntraSubPartitionsSplitType is not equal to ISP_NO_SPLIT, and abs(candIntraPredModeB−ispDefaultMode1) is less than abs(candIntraPredModeA−ispDefaultMode 1), the following applies:
               candModeList[0]=candIntraPredModeB
               candModeList[1]=candIntraPredModeA
            If maxAB-minAB is equal to 1, the following applies:
               candModeList[2]=2+((minAB+61)% 64)
               candModeList[3]=2+((maxAB-1)% 64)
               candModeList[4]=2+((minAB+60)% 64)
               candModeList[5]=2+(maxAB % 64)
            Otherwise if maxAB-minAB is equal to 2, the following applies:
               candModeList[2]=2+((minAB-1)% 64)
               candModeList[3]=2+((minAB+61)% 64)
               candModeList[4]=2+((maxAB-1)% 64)
               candModeList[5]=2+((minAB+60)% 64)
            Otherwise if maxAB-minAB is greater than 61, the following applies:
               candModeList[2]=2+((minAB-1)% 64)
               candModeList[3]=2+((maxAB+61)% 64)
               candModeList[4]=2+(minAB % 64)
               candModeList[5]=2+((maxAB+60)% 64)
            Otherwise, the following applies:
               candModeList[2]=2+((minAB+61)% 64)
               candModeList[3]=2+((minAB-1)% 64)
               candModeList[4]=2+((maxAB+61)% 64)
               candModeList[5]=2+((maxAB-1)% 64)
      Otherwise (candIntraPredModeA or candIntraPredModeB is greater than INTRA_DC), candModeList[x] with x=0 . . . 5 is derived as follows:
         If IntraLumaRefLineIdx[xCb][yCb] is equal to 0 and IntraSubPartitionsSplitType is equal to ISP_NO_ SPLIT, the following applies:
            candModeList[0]=candIntraPredModeA
            candModeList[1]=candIntraPredModeB
            candModeList[2]=1−minAB
            candModeList[3]=2+((maxAB+61)% 64)
            candModeList[4]=2+((maxAB-1)% 64)
            candModeList[5]=2+((maxAB+60)% 64)
         Otherwise, if IntraLumaRefLineIdx[xCb][yCb] is not equal to 0, the following applies:
            candModeList[0]=maxAB
            candModeList[1]=2+((maxAB+61)% 64)
            candModeList[2]=2+((maxAB-1)% 64)
            candModeList[3]=2+((maxAB+60)% 64)
            candModeList[4]=2+(maxAB % 64)
            candModeList[5]=2+((maxAB+59)% 64)
         Otherwise (IntraSubPartitionsSplitType is not equal to ISP_NO_SPLIT), the following applies:
            candModeList[0]=INTRA_PLANAR
            candModeList[1]=maxAB
            candModeList[2]=2+((maxAB+61)% 64)
            candModeList[3]=2+((maxAB-1)% 64)
            candModeList[4]=2+((maxAB+60)% 64)
            candModeList[5]=2+(maxAB % 64)

Otherwise, the following applies:
  If IntraLumaRefLineIdx[xCb][yCb] is equal to 0 and IntraSubPartitionsSplitType is equal to ISP_NO_SPLIT, the following applies:
    candModeList[0]=candIntraPredModeA
    candModeList[1]=(candModeList[0]==INTRA_PLANAR)? INTRA_DC INTRA_PLANAR
    candModeList[2]=INTRA_ANGULAR50
    candModeList[3]=INTRA_ANGULAR18
    candModeList[4]=INTRA_ANGULAR46
    candModeList[5]=INTRA_ANGULAR54
  Otherwise, if IntraLumaRefLineIdx[xCb][yCb] is not equal to 0, the following applies:
    candModeList[0]=INTRA_ANGULAR50
    candModeList[1]=INTRA_ANGULAR18
    candModeList[2]=INTRA_ANGULAR2
    candModeList[3]=INTRA_ANGULAR34
    candModeList[4]=INTRA_ANGULAR66
    candModeList[5]=INTRA_ANGULAR26
  Otherwise, if IntraSubPartitionsSplitType is equal to ISP_HOR_SPLIT, the following applies:
    candModeList[0]=INTRA_PLANAR
    candModeList[1]=INTRA_ANGULAR18
    candModeList[2]=INTRA_ANGULAR25
    candModeList[3]=INTRA_ANGULAR10
    candModeList[4]=INTRA_ANGULAR65
    candModeList[5]=INTRA_ANGULAR50
  Otherwise, if IntraSubPartitionsSplitType is equal to ISP_VER_SPLIT, the following applies:
    candModeList[0]=INTRA_PLANAR
    candModeList[1]=INTRA_ANGULAR50
    candModeList[2]=INTRA_ANGULAR43
    candModeList[3]=INTRA_ANGULAR60
    candModeList[4]=INTRA_ANGULAR3
    candModeList[5]=INTRA_ANGULAR18
  5. IntraPredModeY[xCb][yCb] is derived by applying the following procedure:
    If intra_luma_mpm_flag[xCb][yCb] is equal to 1, the IntraPredModeY[xCb][yCb] is set equal to candModeList[intra_luma_mpm_idx[xCb][yCb]].
    Otherwise, IntraPredModeY[xCb][yCb] is derived by applying the following ordered steps:
      1. When candModeList[i] is greater than candModeList[j] for i=0 . . . 4 and for each i, j=(i+1) . . . 5, both values are swapped as follows:
        (candModeList[i], candModeList[j])=Swap(candModeList[i], candModeList[j])
      2. IntraPredModeY[xCb][yCb] is derived by the following ordered steps:
        i. IntraPredModeY[xCb][yCb] is set equal to intra_luma_mpm_remainder[xCb][yCb].
        ii. For i equal to 0 to 5, inclusive, when IntraPredModeY[xCb][yCb] is greater than or equal to candModeList[i], the value of IntraPredModeY[xCb][yCb] is incremented by one.
  The variable IntraPredModeY[x][y] with x=xCb . . . xCb+cbWidth−1 and y=yCb . . . yCb+cbHeight−1 is set to be equal to IntraPredModeY[xCb][yCb].

It should be noted that in one example, according to the techniques herein, the following step in the construction process above may be skipped:
  When IntraSubPartitionsSphitType is not equal to ISP_NO_SPLIT, and abs(candIntraPredModeB−ispDefaultMode1) is less than abs(candIntraPredlModeA−ispDefaultMode1) the following applies:
    candModeList[0]=candIntraPredModeB
    candModeList[1]=candIIntraPredModeA Table 16 illustrates the merge data syntax provided in JVET-M1001.

TABLE 16

|  | Descriptor |
|---|---|
| merge_data( x0, y0, cbWidth, cbHeight ) { | |
|   mmvd_flag[ x0 ][ y0 ] | ae(v) |
|   if( mmvd_flag[ x0 ][ y0 ] = = 1 ) { | |
|     mmvd_merge_flag[ x0 ][ y0 ] | ae(v) |
|     mmvd_distance_idx[ x0 ][ y0 ] | ae(v) |
|     mmvd_direction_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( sps_ciip_enabled_flag && cu_skip_flag[ x0 ][ y0 ] = = 0 && ( cbWidth * cbHeight) >= 64 && cbWidth < 128 && cbHeight < 128 ) { | |
|         ciip_flag[ x0 ][ y0 ] | ae(v) |
|         if( ciip_flag[ x0 ][ y0 ] ) { | |
|           if ( cbWidth <= 2 * cbHeight || cbHeight <= 2 * cbWidth ) | |
|             ciip_luma_mpm_flag[ x0 ][ y0 ] | ae(v) |
|           if( ciip_luma_mpm_flag[ x0 ][ y0 ] ) | |
|             ciip_luma_mpm_idx[ x0 ][ y0 ] | ae(v) |
|         } | |
|       } | |
|       ... | |
|       else if( MaxNumMergeCand > 1 ) | |
|         merge_idx[ x0 ][ y0 ] | ae(v) |
|     } | |
|   } | |
| } | |

With respect to Table 16, for syntax elements mmvd_flag, mmvd_merge_flag, mmvd_distance_idx, mmvd_direction_idx, merge_subblock_flag, merge_subblock_idx, and merge_idx JVET-M1001 provides the definitions as provided above with respect to Table 4. For syntax elements ciip_flag, ciip_luma_mpm_flag, and ciip_luma_mpm_idx, JVET-M1001 the following semantics:

ciip_flag specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred to be equal to 0.

The syntax elements ciip_luma_mpm_flag and ciip_luma_mpm_idx specify the intra prediction mode for luma samples used in combined inter-picture merge and intra-picture prediction. The array indices x0, y0 specify the location (x, y0) of the top-left luma sample of the considered coding block relative to the top-left luma sample of the picture. The intra prediction mode is derived as provided above with respect to the process for deriving a intra prediction mode in combined merge and intra prediction in JVET-L1001.

When ciip_luma_mpm_flag[x0][y0] is not present, it is inferred as follows:
 If cbWidth is greater than 2*cbHeight or cbHeight is greater than 2*cbWidth, ciip_luma_mpm_flag[x0][y0] is inferred to be equal to 1.
 Otherwise, ciip_luma_mpm_flag[x0][y0] is inferred to be equal to 0.

In one example, according to the techniques herein, video encoder 200 may be configured to construct a unified MPM list for the syntax illustrated in Tables 14-16 as follows. That is, a single/simplified list is created for use with intra_luma_mpm_idx. The same list may be used for ciip_luma_mpm_idx, or, CIIP may not make use of an MPM list for signaling the intra mode.

Input to this process are:
 a luma location (xCb, yCb) specifying the top-left sample of the current luma coding block relative to the top-left luma sample of the current picture,
 a variable cbWidth specifying the width of the current coding block in luma samples,
 a variable cbHeight specifying the height of the current coding block in luma samples.

In this process, the luma intra prediction mode IntraPredModeY[xCb][yCb] is derived.

Table 3, provided above, specifies the value for the intra prediction mode IntraPredModeY[xCb][yCb] and the associated names.

IntraPredModeY[xCb][yCb] is derived by the following ordered steps:
 1. The neighbouring locations (xNbA, yNbA) and (xNbB, yNbB) are set equal to (xCb−1, yCb+cbHeight−1) and (xCb+cbWidth−1, yCb−1), respectively.
 2. For X being replaced by either A or B, the variables candIntraPredModeX are derived as follows:
  The availability derivation process for a block as specified is invoked with the location (xCurr, yCurr) set equal to (xCb, yCb) and the neighbouring location (xNbY, yNbY) set equal to (xNbX, yNbX) as inputs, and the output is assigned to availableX.
  The candidate intra prediction mode candIntraPredModeX is derived as follows:
   If one or more of the following conditions are true, candIntraPredModeX is set equal to INTRA_PLANAR.
    The variable availableX is equal to FALSE.
    CuPredMode[xNbX][yNbX] is not equal to MODE_INTRA and ciip_flag[xNbX][yNbX] is not equal to 1.
    pcm_flag[xNbX][yNbX] is equal to 1.
    X is equal to B and yCb−1 is less than ((yCb>>Ctb Log 2SizeY)<<Ctb Log 2SizeY).
   Otherwise, candIntraPredModeX is set equal to IntraPredModeY[xNbX][yNbX].
 3. The variables ispDefaultMode1, ispDefaultMode2 and ispDefaultMode3 are defined as follows:
  If IntraSubPartitionsSplitType is equal to ISP_HOR_SPLIT, ispDefaultMode1 is set equal to INTRA_ANGULAR18, ispDefaultMode2 is set equal to INTRA_ANGULAR5, and ispDefaultMode3 is set equal to INTRA_ANGULAR11.
  Otherwise, ispDefaultMode1 is set equal to INTRA_ANGULAR50 and ispDefaultMode2 is set equal to INTRA_ANGULAR63, and ispDefaultMode3 is set equal to INTRA_ANGULAR56.
 4. The candModeList[x] with x=0 . . . 5 is derived as follows:
  If candIntraPred ModeB is equal to candIntraPredModeA and candIntraPredModeA is greater than INTRA_DC, candModeList[x] with x=0 . . . 5 is derived as follows:
   candModeList[0]=candIntraPredModeA
   candModeList[1]=2+((candIntraPredModeA+61)% 64)
   candModeList[2]=2+((candIntraPredModeA−1)% 64)
   If one of the following conditions is true,
    IntraSubPartitionsSplitType is equal to ISP_HOR_SPLIT and candIntraPredModeA is less than INTRA_ANGULAR34,
    IntraSubPartitionsSphtType is equal to ISP_VER_SPLIT and candIntraPredModeA is greater than or equal to INTRA_ANGULAR34,
    IntraSubPartitionsSplitType is equal to ISP_NO_SPLIT, the following applies:
     candModeList[3]=2+((candIntraPredModeA+60)% 64)
     candModeList[4]=2+(candIntraPredModeA % 64)
     candModeList[5]=2+((candIntraPredModeA+59)% 64)
   Otherwise, the following applies:
    candModeList[3]=ispDefaultMode1
    candModeList[4]=ispDefaultMode2
    candModeList[5]=ispDefaultMode3
  Otherwise if candIntraPredModeB is not equal to candIntraPredModeA and candIntraPredModeA or candIntraPredModeB is greater than INTRA_DC, the following applies:
   The variables minAB and maxAB are derived as follows:
    minAB=Min(candIntraPredModeA, candIntraPredModeB)
    maxAB=Max(candIntraPredModeA, candIntraPredModeB)

If candIntraPredModeA and candIntraPredModeB are both greater than INTRA_DC, candModeList[x] with x=0 ... 5 is derived as follows:
candModeList[0]=candIntraPredModeA
candModeList[1]=candIntraPredModeB
The following applies:
   When abs(candIntraPredModeB−ispDefaultMode1) is less than abs(candIntraPredModeA−ispDefaultMode1), the following applies:
     candModeList[0]=candIntraPredModeB
     candModeList[1]=candIntraPredModeA
   If maxAB−minAB is equal to 1, the following applies:
     candModeList[2]=2+((minAB+61)% 64)
     candModeList[3]=2+((maxAB−1)% 64)
     candModeList[4]=2+((minAB+60)% 64)
     candModeList[5]=2+(maxAB % 64)
   Otherwise if maxAB−minAB is equal to 2, the following applies:
     candModeList[2]=2+((minAB−1)% 64)
     candModeList[3]=2+((minAB+61)% 64)
     candModeList[4]=2+((maxAB−1)% 64)
     candModeList[5]=2+((minAB+60)% 64)
   Otherwise if maxAB−minAB is greater than 61, the following applies:
     candModeList[2]=2+((minAB−1)% 64)
     candModeList[3]=2+((maxAB+61)% 64)
     candModeList[4]=2+(minAB % 64)
     candModeList[5]=2+((maxAB+60)% 64)
   Otherwise, the following applies:
     candModeList[2]=2+((minAB+61)% 64)
     candModeList[3]=2+((minAB−1)% 64)
     candModeList[4]=2+((maxAB+61)% 64)
     candModeList[5]=2+((maxAB−1)% 64)
Otherwise (candIntraPredModeA or candIntraPredModeB is greater than INTRA_DC), candModeList[x] with x=0.5 is derived as follows:
   The following applies:
     candModeList[0]=maxAB
     candModeList[1]=2+((maxAB+61)% 64)
     candModeList[2]=2+((maxAB−1)% 64)
     candModeList[3]=2+((maxAB+60)% 64)
     candModeList[4]=2+(maxAB % 64)
     candModeList[5]=2+((maxAB+59)% 64)
Otherwise, the following applies:
   If IntraSubPartitionsSplitType is equal to ISP_NO_SPLIT, the following applies:
     candModeList[0]=INTRA_ANGULAR50
     candModeList[1]=INTRA_ANGULAR18
     candModeList[2]=INTRA_ANGULAR2
     candModeList[3]=INTRA_ANGULAR34
     candModeList[4]=INTRA_ANGULAR66
     candModeList[5]=INTRA_ANGULAR26
   Otherwise, if IntraSubPartitionsSplitType is equal to ISP_HOR_SPLIT, the following applies:
     candModeList[0]=INTRA_ANGULAR18
     candModeList[1]=INTRA_ANGULAR25
     candModeList[2]=INTRA_ANGULAR10
     candModeList[3]=INTRA_ANGULAR65
     candModeList[4]=INTRA_ANGULAR50
     candModeList[5]=INTRA_ANGULAR40
   Otherwise, if IntraSubPartitionsSplitType is equal to ISP_VER_SPLIT, the following applies:
     candModeList[0]=INTRA_ANGULAR50
     candModeList[1]=INTRA_ANGULAR43
     candModeList[2]=INTRA_ANGULAR60
     candModeList[3]=INTRA_ANGULAR3
     candModeList[4]=INTRA_ANGULAR18
     candModeList[5]=INTRA_ANGULAR28

5. IntraPredModeY[xCb][yCb] is derived by applying the following procedure:
   If intra_angular_mode_flag[xCb][yCb] is equal to 0 and intra_luma_planar[xCb][yCb] is equal to 1, then IntraPredModeY[xCb][yCb] is the set equal to INTRA_PLANAR
   Otherwise if intra_angular_mode_flag[xCb][yCb] is equal to 0 and intra_luma_planar[xCb][yCb] is equal to 0, then IntraPredModeY[xCb][yCb] is the set equal to INTRA_DC
   Otherwise, if intra_luma_mpm_flag[xCb][yCb] is equal to 1, the IntraPredModeY[xCb][yCb] is set equal to candModeList[intra_luma_mpm_idx[xCb][yCb]].
   Otherwise, IntraPredModeY[xCb][yCb] is derived by applying the following ordered steps:
     1. When candModeList[i] is greater than candModeList[j] for i=0 ... 4 and for each i, j=(i+1) ... 5, both values are swapped as follows:
       (candModeList[i], candModeList[j])=Swap(candModeList[i], candModeList[j])
     2. IntraPredModeY[xCb][yCb] is derived by the following ordered steps:
       i. IntraPredModeY[xCb][yCb] is set equal to intra_luma_mpm_remainder[xCb][yCb]+2.
       ii. For i equal to 0 to 5, inclusive, when IntraPredModeY[xCb][yCb] is greater than or equal to candModeList[i], the value of IntraPredModeY[xCb]H[yCb] is incremented by one.

The variable IntraPredModeY[x][y] with x=xCb ... xCb+cbWidth−1 and y=yCb ... yCb+cbHeight−1 is set to be equal to IntraPredModeY[xCb][yCb].

It should be noted that in the case of this construction of a unified MPM list, in one example, the list determination step(s) based on distance of candidates derived based on spatial neighbors, to default modes (e.g. ispDefaultModeN), may be skipped. For example, the following step may be skipped:
   When abs(candIntraPredModeB−ispDefaultMode1) is less than abs(candIntraPredModeA−ispDefaultMode1), the following applies:
     candModeList[0]=candIntraPredModeB
     candModeList[1]=candIntraPredModeA Further, in one example, according to the techniques herein, video encoder 200 may be configured to construct a unified MPM list for the syntax illustrated in Tables 14-16 as follows:
Input to this process are:
   a luma location (xCb, yCb) specifying the top-left sample of the current luma coding block relative to the top-left luma sample of the current picture,
   a variable cbWidth specifying the width of the current coding block in luma samples,
   a variable cbHeight specifying the height of the current coding block in luma samples.
In this process, the luma intra prediction mode IntraPredModeY[xCb][yCb] is derived.
Table 3, provided above, specifies the value for the intra prediction mode IntraPredModeY[xCb][yCb] and the associated names.

IntraPredModeY[xCb][yCb] is derived by the following ordered steps:
1. The neighbouring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:
   The availability derivation process for a block as specified is invoked with the location (xCurr, yCurr) set equal to (xCb, yCb) and the neighbouring location (xNbY, yNbY) set equal to (xNbX, yNbX) as inputs, and the output is assigned to availableX.
   The candidate intra prediction mode candIntraPredModeX is derived as follows:
      If one or more of the following conditions are true, candIntraPredModeX is set equal to INTRA_PLANAR.
         The variable availableX is equal to FALSE.
         CuPredMode[xNbX][yNbX] is not equal to MODE_INTRA and ciip_flag[xNbX][yNbX] is not equal to 1.
         pcm_flag[xNbX][yNbX] is equal to 1.
         X is equal to B and yCb−1 is less than ((yCb>>Ctb Log 2SizeY)<<Ctb Log 2SizeY).
      Otherwise, candIntraPredModeX is set equal to IntraPredModeY[xNbX][yNbX].
3. The candModeList[x] with x=0 . . . 5 is derived as follows:
   The variables minAB and maxAB are derived as follows:
      minAB=Min(candIntraPredModeA, candIntraPredModeB)
      maxAB=Max(candIntraPredModeA, candIntraPredModeB)
   If maxAB is greater than INTRA_DC, and minAB is equal to maxAB or less than or equal to INTRA_DC candModeList[x] with x=0 . . . 5 is derived as follows:
      candModeList[x] with x=0 . . . 2 is set equal to maxAB−2
         If one of the following conditions is true,
         IntraSubPartitionsSplitType is equal to ISP_HOR_SPLIT and candIntraPredModeA is less than INTRA_ANGULAR34 and minAB is not equal to maxAB,
         IntraSubPartitionsSplitType is equal to ISP_VER_SPLIT and candIntraPredModeA is greater than or equal to INTRA_ANGULAR34 and minAB is not equal to maxAB,
         IntraSubPartitionsSplitType is equal to ISP_NO_SPLIT, the following applies:
            candModeList[x] with x=3 . . . 5 is set equal to maxAB−2
            The variable mpmTblIdx is set to 4
         Otherwise, the following applies:
            candModeList[x] with x=3 . . . 5 is set equal to 0
            The variable mpmTblIdx is set to 4+IntraSubPartitionsSplitType
   Otherwise if minAB is greater than INTRA_DC, the following applies:
      candModeList[x] with x=0 . . . 5 is derived as follows:
         candModeList[x] with x=0, 3, 5 is set equal to maxAB−2
         candModeList[x] with x=1, 2, 4 is set equal to minAB−2
         The variable mpmTblIdx is set to Clip3(0, 3, ((maxAB−minAB+2) & 63)−2)
      Otherwise, the following applies:
         candModeList[x] with x=0 . . . 5 is set equal to 0
         The variable mpmTblIdx is set to 7+IntraSubPartitionsSplitType
      candModeList[x] with x=0 . . . 5 is updated according to:
         candModeList[x]=((candModeList[x]+mpmTbl[mpmTblIdx][x]) & (x==0? 127:63))+2, where mpmTbl is an array defined as:

| mpmTblIdx | x | | | | | |
|---|---|---|---|---|---|---|
| | 0 | 1 | 2 | 3 | 4 | 5 |
| 0 | 0 | 0 | 1 | 63 | 2 | 62 |
| 1 | 0 | 0 | 63 | 1 | 62 | 2 |
| 2 | 0 | 0 | 1 | 1 | 63 | 2 |
| 3 | 0 | 0 | 63 | 63 | 1 | 1 |
| 4 | 0 | 63 | 1 | 62 | 2 | 61 |
| 5 | 0 | 63 | 1 | 16 | 3 | 9 |
| 6 | 0 | 63 | 1 | 48 | 61 | 55 |
| 7 | 48 | 16 | 0 | 32 | 63 | 24 |
| 8 | 16 | 23 | 8 | 63 | 48 | 38 |
| 9 | 48 | 41 | 56 | 1 | 16 | 26 |

4. IntraPredModeY[xCb][yCb] is derived by applying the following procedure:
   If intra_angular_mode_flag[xCb][yCb] is equal to 0 and intra_luma_planar[xCb][yCb] is equal to 1, then IntraPredModeY[xCb][yCb] is the set equal to INTRA_PLANAR
   Otherwise if intra_angular_mode_flag[xCb][yCb] is equal to 0 and intra_luma_planar[xCb][yCb] is equal to 0, then IntraPredModeY[xCb][yCb] is the set equal to INTRA_DC
   Otherwise, if intra_luma_mpm_flag[xCb][yCb] is equal to 1, the IntraPredModeY[xCb][yCb] is set equal to candModeList[intra_luma_mpm_idx[xCb][yCb]].
   Otherwise, IntraPredModeY[xCb][yCb] is derived by applying the following ordered steps:
      1. When candModeList[i] is greater than candModeList[j] for i=0 . . . 4 and for each i, j=(i+1) . . . 5, both values are swapped as follows:
         (candModeList[i], candModeList[j])=Swap(candModeList[i], candModeList[j])
      2. IntraPredModeY[xCb][yCb] is derived by the following ordered steps:
         i. IntraPredModeY[xCb][yCb] is set equal to intra_luma_mpm_remainder[xCb][yCb]+2.
         ii. For i equal to 0 to 5, inclusive, when IntraPredModeY[xCb][yCb] is greater than or equal to candModeList[i], the value of IntraPredModeY[xCb][yCb] is incremented by one.
The variable IntraPredModeY[x][y] with x=xCb . . . xCb+cbWidth−1 and y=yCb . . . yCb+cbHeight−1 is set to be equal to IntraPredModeY[xCb][yCb].

Further, in one example, according to the techniques herein, the dependency on IntraSubPartitionsSplitType may be removed from the above construction of a unified MPM list to reduce to number of required operations and video encoder 200 may be configured to construct a unified MPM list for the syntax illustrated in Tables 14-16 as follows:
Input to this process are:
  a luma location (xCb, yCb) specifying the top-left sample of the current luma coding block relative to the top-left luma sample of the current picture,
  a variable cbWidth specifying the width of the current coding block in luma samples,
  a variable cbHeight specifying the height of the current coding block in luma samples.
In this process, the luma intra prediction mode IntraPredModeY[xCb][yCb] is derived.
Table 3, provided above, specifies the value for the intra prediction mode IntraPredModeY[xCb][yCb] and the associated names.
IntraPredModeY[xCb][yCb] is derived by the following ordered steps:
  1. The neighbouring locations (xNbA, yNbA) and (xNbB, yNbB) are set equal to (xCb−1, yCb+cbHeight−1) and (xCb+cbWidth−1, yCb−1), respectively.
  2. For X being replaced by either A or B, the variables candIntraPredModeX are derived as follows:
    The availability derivation process for a block as specified is invoked with the location (xCurr, yCurr) set equal to (xCb, yCb) and the neighbouring location (xNbY, yNbY) set equal to (xNbX, yNbX) as inputs, and the output is assigned to availableX.
    The candidate intra prediction mode candIntraPredModeX is derived as follows:
      If one or more of the following conditions are true, candIntraPredModeX is set equal to INTRA_PLANAR.
        The variable availableX is equal to FALSE.
        CuPredMode[xNbX][yNbX] is not equal to MODE_INTRA and ciip_flag[xNbX][yNbX] is not equal to 1.
        pcm_flag[xNbX][yNbX] is equal to 1.
        X is equal to B and yCb−1 is less than ((yCb>>Ctb Log 2SizeY)<<Ctb Log 2SizeY).
      Otherwise, candIntraPredModeX is set equal to IntraPredModeY[xNbX][yNbX].
  3. The candModeList[x] with x=0 . . . 5 is derived as follows:
    The variables minAB and maxAB are derived as follows:
      minAB=Min(candIntraPredModeA, candIntraPredModeB)
      maxAB=Max(candIntraPredModeA, candIntraPredModeB)
    If maxAB is greater than INTRA_DC, and minAB is equal to maxAB or less than or equal to INTRA_DC the follow applies:
      candModeList[x] with x=0 . . . 5 is set equal to maxAB−2
      The variable mpmTblIdx is set to 4
    Otherwise if minAB is greater than INTRA_DC, the following applies:
      candModeList[x] with x=0 . . . 5 is derived as follows:
        candModeList[x] with x=0, 3, 5 is set equal to maxAB−2
        candModeList[x] with x=1, 2, 4 is set equal to minAB−2
      The variable mpmTblIdx is set to Clip3(0, 3, ((maxAB−minAB+2) & 63)−2)
    Otherwise, the following applies:
      candModeList[x] with x=0 . . . 5 is set equal to 0
      The variable mpmTblIdx is set to 5
    candModeList[x] with x=0 . . . 5 is updated according to:
      candModeList[x]=((candModeList[x]+mpmTbl[mpmTblIdx][x]) & (x==0? 127:63))+2, where mpmTbl is an array defined as:

|         | x |   |   |   |   |   |
|---------|---|---|---|---|---|---|
| mpmTbIdx | 0 | 1 | 2 | 3 | 4 | 5 |
| 0 | 0 | 0 | 1 | 63 | 2 | 62 |
| 1 | 0 | 0 | 63 | 1 | 62 | 2 |
| 2 | 0 | 0 | 1 | 1 | 63 | 2 |
| 3 | 0 | 0 | 63 | 63 | 1 | 1 |
| 4 | 0 | 63 | 1 | 62 | 2 | 61 |
| 5 | 48 | 16 | 0 | 32 | 63 | 24 |

4. IntraPredModeY[xCb][yCb] is derived by applying the following procedure:
    If intra_angular_mode_flag[xCb][yCb] is equal to 0 and intra_luma_planar[xCb][yCb] is equal to 1, then IntraPredModeY[xCb][yCb] is the set equal to INTRA_PLANAR
    Otherwise if intra_angular_mode_flag[xCb][yCb] is equal to 0 and intra_luma_planar[xCb][yCb] is equal to 0, then IntraPredModeY[xCb][yCb] is the set equal to INTRA_DC
    Otherwise, if intra_luma_mpm_flag[xCb][yCb] is equal to 1, the IntraPredModeY[xCb][yCb] is set equal to candModeList[intra_luma_mpm_idx[xCb][yCb]].
    Otherwise, IntraPredModeY[xCb][yCb] is derived by applying the following ordered steps:
      1. When candModeList[i] is greater than candModeList[j] for i=0 . . . 4 and for each i, j=(i+1) . . . 5, both values are swapped as follows:
        (candModeList[i], candModeList[j])=Swap(candModeList[i], candModeList[j])
      2. IntraPredModeY[xCb][yCb] is derived by the following ordered steps:
        i. IntraPredModeY[xCb][yCb] is set equal to intra_luma_mpm_remainder[xCb][yCb]+2.
        ii. For i equal to 0 to 5, inclusive, when IntraPredModeY[xCb][yCb] is greater than or equal to candModeList[i], the value of IntraPredModeY[xCb][yCb] is incremented by one.
The variable IntraPredModeY[x][y] with x=xCb . . . xCb+cbWidth−1 and y=yCb . . . yCb+cbHeight−1 is set to be equal to IntraPredModeY[xCb][yCb].
It should be noted that in the case of this construction of a unified MPM list, in one example, the binarization of intra_luma_mpm_remainder may use a truncated binary (TB) binarization process with cMax=NUM_LUMA_MODE (67)−NUM_MOST_PROBABLE_MODES (6)−3=58.
In one example, this construction of a unified MPM list may be modified to a MPM list with 4 angular modes by truncating the unified 6 MPM list described to 4 MPM. That is, the last 2 entries in the MPM list of the 6 MPM list construction process may be deleted (i.e., entries candModeList[4] and candModeList[5] may be discarded). Further, techniques other than a simple truncation may be used for construction a 4 MPM list based on a 6 MPM list construction process.

In one example, according to the techniques herein, video encoder 200 may be configured to construct a unified MPM list for the example syntax illustrated in Tables 14-16 as follows:

Input to this process are:
- a luma location (xCb, yCb) specifying the top-left sample of the current luma coding block relative to the top-left luma sample of the current picture,
- a variable cbWidth specifying the width of the current coding block in luma samples,
- a variable cbHeight specifying the height of the current coding block in luma samples.

In this process, the luma intra prediction mode IntraPredModeY[xCb][yCb] is derived.

Table 3, provided above, specifies the value for the intra prediction mode IntraPredModeY[xCb][yCb] and the associated names.

IntraPredModeY[xCb][yCb] is derived by the following ordered steps:
1. The neighbouring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:
    The availability derivation process for a block as specified is invoked with the location (xCurr, yCurr) set equal to (xCb, yCb) and the neighbouring location (xNbY, yNbY) set equal to (xNbX, yNbX) as inputs, and the output is assigned to availableX.
    The candidate intra prediction mode candIntraPredModeX is derived as follows:
        If one or more of the following conditions are true, candIntraPredModeX is set equal to INTRA_PLANAR.
        The variable availableX is equal to FALSE.
        CuPredMode[xNbX][yNbX] is not equal to MODE_INTRA and ciip_flag[xNbX][yNbX] is not equal to 1.
        pcm_flag[xNbX][yNbX] is equal to 1.
        X is equal to B and yCb−1 is less than ((yCb>>Ctb Log 2SizeY)<<Ctb Log 2SizeY).
        Otherwise, candIntraPredModeX is set equal to IntraPredModeY[xNbX][yNbX].
3. The variables ispDefaultMode1 and ispDefaultMode2 are defined as follows:
    If IntraSubPartitionsSplitType is equal to ISP_HOR_SPLIT, ispDefaultMode1 is set equal to INTRA_ANGULAR18 and ispDefaultMode2 is set equal to INTRA_ANGULAR5.
    Otherwise, ispDefaultMode1 is set equal to INTRA_ANGULAR50 and ispDefaultMode2 is set equal to INTRA_ANGULAR63.
4. The candModeList[x] with x=0 . . . 3 is derived as follows:
    If candIntraPredModeB is equal to candIntraPredModeA and candIntraPredModeA is greater than INTRA_DC, candModeList[x] with x=0 . . . 3 is derived as follows:
        candModeList[0]=candIntraPredModeA
        candModeList[1]=2+((candIntraPredModeA+61)% 64)
        candModeList[2]=2+((candIntraPredModeA−1)% 64)
        If one of the following conditions is true, IntraSubPartitionsSplitType is equal to ISP_HOR_SPLIT and candIntraPredModeA is less than INTRA_ANGULAR34, IntraSubPartitionsSplitType is equal to ISP_VER_SPLIT and candIntraPredModeA is greater than or equal to INTRA_ANGULAR34, IntraSubPartitionsSplitType is equal to ISP_NO_SPLIT, the following applies:
            candModeList[3]=2+((candIntraPredModeA+60)% 64)
        Otherwise, the following applies:
            candModeList[2]=ispDefaultMode1
            candModeList[3]=ispDefaultMode2
        In one example, instead of:
            candModeList[2]=ispDefaultMode1
            candModeList[3]=ispDefaultMode2
        the following alternative assignment of only candModeList[3] may be made:
            candModeList[3]=ispDefaultMode1
    Otherwise if candIntraPredModeB is not equal to candIntraPredModeA and candIntraPredModeA or candIntraPredModeB is greater than INTRA_DC, the following applies:
        The variables minAB and maxAB are derived as follows:
            minAB=Min(candIntraPredModeA, candIntraPredModeB)
            maxAB=Max(candIntraPredModeA, candIntraPredModeB)
        If candIntraPredModeA and candIntraPredModeB are both greater than INTRA_DC, candModeList[x] with x=0 . . . 3 is derived as follows:
            candModeList[0]=candIntraPredModeA
            candModeList[1]=candIntraPredModeB
        The following applies:
            When abs(candIntraPredModeB−ispDefaultMode1) is less than abs(candIntraPredModeA−ispDefaultMode1), the following applies:
                candModeList[0]=candIntraPredModeB
                candModeList[1]=candIntraPredModeA
            If maxAB−minAB is equal to 1, the following applies:
                candModeList[2]=2+((minAB+61)% 64)
                candModeList[3]=2+((maxAB−1)% 64)
            Otherwise if maxAB−minAB is equal to 2, the following applies:
                candModeList[2]=2+((minAB−1)% 64)
                candModeList[3]=2+((minAB+61)% 64)
            Otherwise if maxAB−minAB is greater than 61, the following applies:
                candModeList[2]=2+((minAB−1)% 64)
                candModeList[3]=2+((maxAB+61)% 64)
            Otherwise, the following applies:
                candModeList[2]=2+((minAB+61)% 64)
                candModeList[3]=2+((minAB−1)% 64)
        Otherwise (candIntraPredModeA or candIntraPredModeB is greater than INTRA_DC), candModeList[x] with x=0.3 is derived as follows:
            The following applies:
                candModeList[0]=maxAB
                candModeList[1]=2+((maxAB+61)% 64)

candModeList[2]=2+((maxAB−1)% 64)
candModeList[3]=2+((maxAB+60)% 64)
Otherwise, the following applies:
  If IntraSubPartitionsSplitType is equal to ISP_NO_SPLIT, the following applies:
    candModeList[0]=INTRA_ANGULAR50
    candModeList[1]=INTRA_ANGULAR18
    candModeList[2] INTRA_ANGULAR2
    candModeList[3]=INTRA_ANGULAR34
  Otherwise, if IntraSubPartitionsSplitType is equal to ISP_HOR_SPLIT, the following applies:
    candModeList[0]=INTRA_ANGULAR18
    candModeList[1]=INTRA_ANGULAR25
    candModeList[2]=INTRA_ANGULAR10
    candModeList[3]=INTRA_ANGULAR65
  Otherwise, if IntraSubPartitionsSplitType is equal to ISP_VER_SPLIT, the following applies:
    candModeList[0]=INTRA_ANGULAR50
    candModeList[1]=INTRA_ANGULAR43
    candModeList[2]=INTRA_ANGULAR60
    candModeList[3]=INTRA_ANGULAR3
5. IntraPredModeY[xCb][yCb] is derived by applying the following procedure:
  If intra_angular_mode_flag[xCb][yCb] is equal to 0 and intra_luma_planar[xCb][yCb] is equal to 1, then IntraPredModeY[xCb][yCb] is the set equal to INTRA_PLANAR
  Otherwise if intra_angular_mode_flag[xCb][yCb] is equal to 0 and intra_luma_planar[xCb][yCb] is equal to 0, then IntraPredModeY[xCb][yCb] is the set equal to INTRA_DC
  Otherwise, if intra_luma_mpm_flag[xCb][yCb] is equal to 1, the IntraPredModeY[xCb][yCb] is set equal to candModeList[intra_luma_mpm_idx[xCb][yCb]].
  Otherwise, IntraPredModeY[xCb][yCb] is derived by applying the following ordered steps:
    1. When candModeList[i] is greater than candModeList[j] for i=0 . . . 2 and for each i, j=(i+1) . . . 3, both values are swapped as follows:
       (candModeList[i], candModeList[j])=Swap(candModeList[i], candModeList[j])
    2. IntraPredModeY[xCb][yCb] is derived by the following ordered steps:
       i. IntraPredModeY[xCb][yCb] is set equal to intra_luma_mpm_remainder[xCb][yCb]+2.
       ii. For i equal to 0 to 3, inclusive, when IntraPredModeY[xCb][yCb] is greater than or equal to candModeList[i], the value of IntraPredModeY[xCb][yCb] is incremented by one.
The variable IntraPredModeY[x][y] with x=xCb . . . xCb+cbWidth−1 and y=yCb . . . yCb+cbHeight−1 is set to be equal to IntraPredModeY[xCb][yCb].

It should be noted that in the case of this construction of a unified MPM list, in one example, the binarization of intra_luma_mpm_idx may use a truncated rice (TR) binarization process with cMax=3 and cRiceParam=0.

In one example, according to the techniques herein, video encoder 200 may be configured to signal an intra prediction mode based on the example syntax illustrated in Table 17. That is, in this example, intra_luma_planar_flag is only received when intra_luma_angular_mode_flag is false and intra subpartitions mode is not used.

TABLE 17

|  | Descriptor |
|---|---|
| coding_unit( x0, y0, cbWidth, cbHeight, treeType ) { | |
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|   ... | |
|   } else { | |
|     if( treeType = = SINGLE_TREE || treeType = = DUAL_TREE_LUMA ) | |
|   { | |
|       if( ( y0% CtbSizeY ) > 0 ) | |
|         intra_luma_ref_idx[ x0 ][ y0 ] | ae(v) |
|       if (intra_luma_ref_idx[ x0 ][ y0 ] = = 0 && | |
|         ( cbWidth <= MaxTbSizeY || cbHeight <= MaxTbSizeY ) && | |
|         ( cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] = = 1 && | |
|         cbWidth <= MaxTbSizeY && cbHeight <= MaxTbSizeY ) | |
|         intra_subpartitions_split_flag[ x0 ][ y0 ] | ae(v) |
|       if( intra_luma_ref_idx[ x0 ][ y0 ] = = 0 ) | |
|         intra_luma_angular_mode_flag[ x0 ][ y0 ] | ae(v) |
|       if (intra_luma_angular_mode_flag[ x0 ][ y0 ] != 0) { | |
|         if( intra_luma_ref_idx[ x0 ][ y0 ] == 0 && | |
|   intra_subpartitions_mode_flag[ x0 ][ y0 ] == 0 ) | |
|         intra_luma_mpm_flag[ x0 ][ y0 ] | ae(v) |
|         if( intra_luma_mpm_flag[ x0 ][ y0 ]) | |
|           intra_luma_mpm_idx[ x0 ][ y0 ] | ae(v) |
|         else | |
|           intra_luma_mpm_remainder[ x0 ][ y0 ] | ae(v) |
|       } else if( intra_subpartitions_mode_flag[ x0 ][ y0 ] == 0 ) | |
|         intra_luma_planar_flag[ x0 ][ y0 ] | ae(v) |
|   } | |

TABLE 17-continued

|  | Descriptor |
|---|---|
| `        if( treeType = = SINGLE_TREE || treeType = =`<br>`DUAL_TREE_CHROMA )` | |
| `            intra_chroma_pred_mode[ x0 ][ y0 ]` | ae(v) |
| `        }` | |
| `    } else if( treeType != DUAL_TREE_CHROMA ) { /* MODE_INTER */` | |
| `        if( cu_skip_flag[ x0 ][ y0 ] = = 0 )` | |
| `            merge_flag[ x0 ][ y0 ]` | ae(v) |
| `        if( merge_flag[ x0 ][ y0 ] ) {` | |
| `            merge_data( x0, y0, cbWidth, cbHeight)` | |
| `        } else {` | |
| ... | |
| `        if( CuPredMode[ x0 ][ y0 ] != MODE_INTRA &&`<br>`merge_flag[ x0 ][ y0 ] = = 0)` | |
| `            cu_cbf` | ae(v) |
| ... | |

With respect to Table 17, for syntax elements cu_skip_flag, pred_mode_flag, intra_luma_ref_idx, intra_subpartitions_mode_flag, intra_subpartitions_split_flag intra_chroma_pred_mode, merge_flag, and cu_cbf may be based on the definitions provided above with respect to Table 14. Syntax elements intra_luma_angular_mode_flag and intra_luma_planar_flag, intra_luma_mpm_flag, intra_luma_mpm_idx and intra_luma_mpm_remainder may be based on the following definitions:

intra_luma_angular_mode_flag[x0][y0] equal to 1 specifies that the intra prediction mode for luma samples is angular. intra_luma_angular_mode_flag[x0][y0] equal to 0 specifies that the intra prediction mode for luma samples is not angular. When intra_luma_angular_mode_flag[x0][y0] is not present it is inferred to be equal to 1.

intra_luma_planar_flag[x0][y0] equal to 1 specifies that the intra prediction mode for luma samples is PLANAR. intra_luma_planar_flag[x0][y0] equal to 0 specifies that the intra prediction mode for luma samples is DC. When intra_luma_planar_flag[x0][y0] is not present it is inferred to be equal to 1.

The syntax elements intra_luma_mpm_flag[x0][y0], intra_luma_mpm_idx[x0][y0] and intra_luma_mpm_remainder[x0][y0] specify the angular intra prediction mode for luma samples. The array indices x0, y0 specify the location (x0, y0) of the top-left luma sample of the considered coding block relative to the top-left luma sample of the picture. When intra_luma_angular_mode_flag[x0][y0] is equal to 1 and intra_luma_mpm_flag[x0][y0] is equal to 1, the intra prediction mode is inferred from a neighbouring intra-predicted coding unit as provided below.

When intra_luma_mpm_flag[x0 If y0] is not present, it is inferred to be equal to 1.

With respect to the syntax elements intra_luma_mpm_flag, intra_luma_mpm_idx and intra_luma_mpm_remainder, the process for inferring a intra prediction mode from a neighbouring intra-predicted coding unit may be based on any of the processes provided above.

In one example, according to the techniques herein, video encoder 200 may be configured to signal an intra prediction mode based on the example syntax illustrated in Table 18. That is, in this example, an prediction mode for the cases where intra_luma_ref_idx indicates the intra prediction reference line index as the non-zero case (i.e., a multi-line reference (MRL) mode) or the case of intra subpartition prediction is allowed to be selected from the non-MPM list which increases prediction flexibility which is desirable. Further, it also allows MRL modes and ISP modes to recover from bad/incorrect mode decisions in adjacent blocks (i.e., since MPM lists are constructed based on intra mode selected for adjacent blocks).

TABLE 18

|  | Descriptor |
|---|---|
| `coding_unit( x0, y0, cbWidth, cbHeight, treeType ) {` | |
| `    if( tile_group_type != I ) {` | |
| `        if( treeType != DUAL_TREE_CHROMA )` | |
| `            cu_skip_flag[ x0 ][ y0 ]` | ae(v) |
| `        if( cu_skip_flag[ x0 ][ y0 ] = = 0 )` | |
| `            pred_mode_flag` | ae(v) |
| `    }` | |
| `    if( CuPredMode[ x0 ][ y0 ] = = MODE_INTRA ) {` | |
| ... | |
| `    } else {` | |
| `        if( treeType = = SINGLE_TREE || treeType = = DUAL_TREE_LUMA )` | |
| `{` | |
| `            if( ( y0% CtbSizeY ) > 0 )` | |
| `                intra_luma_ref_idx[ x0 ][ y0 ]` | ae(v) |
| `            if(intra_luma_ref_idx[ x0 ][ y0 ] = = 0 &&`<br>`                ( cbWidth <= MaxTbSizeY || cbHeight <= MaxTbSizeY ) &&`<br>`                ( cbWidth * cbHeight > MinTbSizeY * MinTbSizeY ))` | |
| `                intra_subpartitions_mode_flag[ x0 ][ y0 ]` | ae(v) |
| `            if( intra_subpartitions_mode_flag[ x0 ][ y0 ] = = 1 &&`<br>`                cbWidth <= MaxTbSizeY && cbHeight <= MaxTbSizeY )` | |
| `                intra_subpartitions_split_flag[ x0 ][ y0 ]` | ae(v) |
| `            if( intra_luma_ref_idx[ x0 ][ y0 ] = = 0 ) {` | |

TABLE 18-continued

| | Descriptor |
|---|---|
|                             intra_luma_angular_mode_flag[ x0 ][ y0 ] | ae(v) |
|                             if (intra_subpartitions_mode_flag[ x0 ][ y0 ] = = 0) | |
|                                   intra_luma_planar_flag[ x0 ][ y0 ] | ae(v) |
|                         } | |
|                     if( intra_luma_angular_mode_flag[ x0 ][ y0 ] != 0 ) { | |
|                         intra_luma_mpm_flag[ x0 ][ y0 ] | ae(v) |
|                         if( intra_luma_mpm_flag[ x0 ][ y0 ] ) | |
|                             intra_luma_mpm_idx[ x0 ][ y0 ] | ae(v) |
|                         else | |
|                             intra_luma_mpm_remainder[ x0 ][ y0 ] | ae(v) |
|                     } | |
|         } | |
|         if( treeType = = SINGLE_TREE || treeType = = DUAL_TREE_CHROMA ) | |
|             intra_chroma_pred_mode[ x0 ][ y0 ] | ae(v) |
|     } | |
|     } else if( treeType != DUAL_TREE_CHROMA ) { /* MODE_INTER */ | |
|         if( cu_skip_flag[ x0 ][ y0 ] = = 0 ) | |
|             merge_flag[ x0 ][ y0 ] | ae(v) |
|         if( merge_flag[ x0 ][ y0 ] ) { | |
|             merge_data( x0, y0, cbWidth, cbHeight ) | |
|         } else { | |
| ... | |
|         if( CuPredMode[ x0 ][ y0 ] != MODE_INTRA && merge_flag[ x0 ][ y0 ] = = 0 ) | |
|             cu_cbf | ae(v) |
| ... | |

With respect to Table 18, syntax elements cu_skip_flag, pred_mode_flag, intra_luma_ref_idx, intra_subpartitions_mode_flag, intra_subpartitions_split_flag, intra_luma_angular_mode_flag, intra_luma_planar_flag, intra_luma_mpm_flag, intra_luma_mpm_idx, intra_luma_mpm_remainder intra_chroma_pred_mode, merge_flag, and cu_cbf may be based on the definitions provided above with respect to Table 17.

In one example, according to the techniques herein, the context bin(s) of intra prediction syntax elements e.g., intra_luma_angular_mode_flag may be selected based on the ISP syntax element, e.g., based on whether intra_subpartitions_mode_flag is true. In one example, the context of intra_luma_angular_mode_flag may be selected from one of five contexts in a set based on intra mode/availability of four spatial locations. For example, as follows:

ctxInc is between 0 . . . 9 and derived as follows:

Input to this process is the luma location (x0, y0) specifying the top-left luma sample of the current luma block relative to the top-left sample of the current picture, the colour component cIdx, the current coding quadtree depth cqDepth, and the width and the height of the current coding block in luma samples cbWidth and cbHeight.

Output of this process is ctxInc.

The availability derivation process for a block is invoked with the location (xCurr, yCurr) set equal to (x0, y0) and the neighbouring location (xNbY, yNbY) set equal to (x0−1, y0) as inputs, and the output is assigned to availableL.

The availability derivation process for a block is invoked with the location (xCurr, yCurr) set equal to (x0, y0) and the neighbouring location (xNbY, yNbY) set equal to (x0−1, y0+cbHeight−1) as inputs, and the output is assigned to availableLB.

The availability derivation process for a block is invoked with the location (xCurr, yCurr) set equal to (x, y0) and the neighbouring location (xNbY, yNbY) set equal to (x0, y0−1) as inputs, and the output is assigned to availableA.

The availability derivation process for a block is invoked with the location (xCurr, yCurr) set equal to (x0, y0) and the neighbouring location (xNbY, yNbY) set equal to (x0+cbWidth−1, y0−1) as inputs, and the output is assigned to availableAR.

The same CTU checking process for a block is invoked with the location (xCurr, yCurr) set equal to (x0, y0) and the neighbouring location (xNbY, yNbY) set equal to (x0, y0−1) as inputs, and the output is assigned to sameCtuA.

The same CTU checking process for a block is invoked with the location (xCurr, yCurr) set equal to (x0, y0) and the neighbouring location (xNbY, yNbY) set equal to (x0+cbWidth−1, y0−1) as inputs, and the output is assigned to sameCtuAR.

The assignment of ctxInc is specified as follows with condL, condLB, condA and condAR for the syntax elements intra_luma_angular_mode_flag[x0][y0] specified in Table 19:

ctxInc=(condL && availableL)+(condLB && availableLB)+(condA && availableA && sameCtuA)+(condAR && availableAR && sameCtuAR)+(intra_subpartitions_mode_flag[x0][y0]!=0? 5:0)

TABLE 19

| Syntax element | condL | condLB | condA | condAR |
|---|---|---|---|---|
| intra_luma_angular_mode_flag[ x0 ][ y0 ] | CuPredMode[ xNbL ][ yNbL ] is equal to MODE_INTRA && | CuPredMode[ xNbLB ][ yNbLB ] is equal to MODE_INTRA && | CuPredMode[ xNbA ][ yNbA ] is equal to MODE_INTRA && | CuPredMode[ xNbAR ][ yNbAR ] is equal to MODE_INTRA && |

TABLE 19-continued

| Syntax element | condL | condLB | condA | condAR |
|---|---|---|---|---|
| | intra_luma_ang ular_mode_flag[ xNbL ][ yNbL ] is equal to 1 | intra_luma_ang ular_mode_flag[ xNbLB ][ yNbLB ] is equal to 1 | intra_luma_ang ular_mode_flag[ xNbA ][ yNbA ] is equal to 1 | intra_luma_ang ular_mode_flag[ xNbAR ][ yNbA R ] is equal to 1 |

In one example, a CTU checking process may be as provided above.

In one example, the context of intra_luma_angular_mode_flag may be selected from one of five contexts in a set based on intra mode/availability of four spatial locations. For example, as follows:

TABLE 20

| Syntax element | condLB | condAR |
|---|---|---|
| intra_luma_a ngular_mode _flag[ x0 ][ y0 ] | CuPredMode[ x NbLB ][ yNbLB ] is equal to MODE_INTRA && intra_luma_ang ular_mode_flag[ xNbLB ][ yNbLB ] is equal to 1 | CuPredMode[ x NbAR ][ yNbAR ] is equal to MODE_INTRA && intra_luma_ang ular_mode_flag[ xNbAR ][ yNbA R ] is equal to 1 |

In one example, a CTU checking process may be as provided above.

In one example, the context of intra_luma_mpm_flag, may be selected based on the values of intra_subpartitions_mode_flag and intra_subpartitions_split_flag, For example, the context ctxInc of intra_luma_mpm_flag may be selected as follows:

ctxInc=intra_subpartitions_mode_flag[x0][y0]!=0||intra_luma_ref_idx!=0? 1:0

Alternatively, it may be selected as follows:

ctxInc=intra_subpartitions_mode_flag[x0][y0]!=0? 2: (intra_luma_ref_idx!=0?1:0)

Alternatively, it may be selected as follows:

ctxInc=intra_subpartitions_mode_flag[x0][y0]!=0? (2+intra_subpartitions_split_flag[x0][y0]): (intra_luma_ref_idx!=0? 1:0)

It should noted that in other examples, the context bin(s) of intra prediction syntax elements e.g., intra_luma_angular_mode_flag, intra_luma_planar_flag, intra_luma_mpm_idx, intra_luma_mpm_remainder may selected in a similar manner.

In one example, the context bin(s) of intra prediction syntax elements may be selected from a context set where the context set is determined from values of intra_luma_ref_idx, intra_subpartitions_mode_flag and intra_subpartitions_split_flag. For example, a context set may selected according to Table 21.

TABLE 21

| intra_luma_ref_idx | IntraSubPartitionsSplitType | Context Set |
|---|---|---|
| 0 | 0 | A |
| 0 | 1 | B |
| 0 | 2 | C |
| 1 OR 2 | 0 | D |

TABLE 21-continued

| intra_luma_ref_idx | IntraSubPartitionsSplitType | Context Set |
|---|---|---|
| 1 OR 2 | 1 | E |
| 1 OR 2 | 2 | F |

It should be noted that the cases, in Table 21 corresponding to context set E and F are currently not allowed in JVET-M1001. However, these cases may correspond to cases of ISP using MRL. In one example, context set A and context set D may be the same, and as such, in this case, further selection within the context may not based on reference line index. In one example, context set B and context set C may be the same, and as such in this case, further selection within the context is not based on the ISP mode.

In one example, according to the techniques herein, according to the techniques herein, video encoder 200 may be configured search for the a best intra prediction mode. In some cases, the search for best intra mode may be based on intra mode/availability of neighboring blocks. In some cases, the search for best intra mode may be based on intra modes that correspond to the ones with N least bit-cost for signaling the mode.

Referring again to FIG. 5, as illustrated in FIG. 5, inter prediction processing unit 214 may receive reconstructed video block via filter unit 216, which may be part of an in-loop filtering process. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data. Entropy encoding unit 218 receives quantized transform coefficients and predictive syntax data (i.e., intra prediction data, motion prediction data, QP data, etc.). Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. In this manner, video encoder 200 represents an example of a device configured to determine an intra prediction mode used for generating a prediction for a current video block, signal a first flag indicating whether the intra prediction mode is an angular intra prediction mode, and conditionally signal a second flag indicating whether the intra prediction mode is a DC mode or a planar mode, when the first flag indicates that the intra prediction mode is not an angular intra prediction mode.

Figure 6:
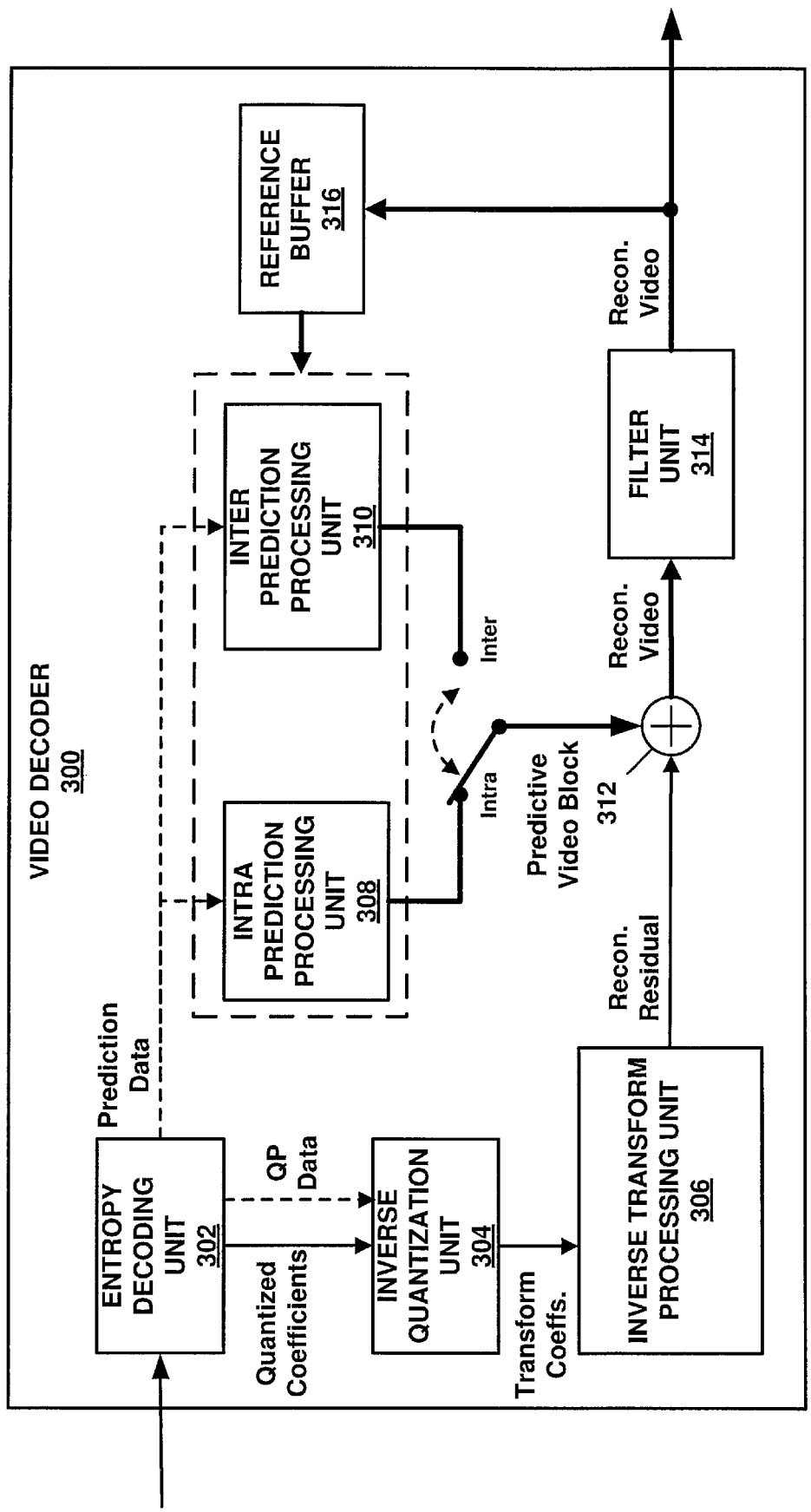
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 6 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 6, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. Inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 6, reconstructed residual data may be provided to summer 312. Summer 312 may add reconstructed residual data to a predictive video block and generate reconstructed video data.

As described above, a predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block.

As described above, video decoder 300 may parse an encoded bitstream where the encoded bitstream is generated based on the techniques described above and as described above, video encoder 200 may generate a bitstream according to the intra prediction techniques described above. Thus, video decoder 300 may be configured to perform intra prediction according to techniques described above. In this manner, video decoder 300 represents an example of a device configured to parse a first flag indicating whether an intra prediction mode used for generating a prediction for a current video block is an angular intra prediction mode, and conditionally parse a second flag indicating whether the intra prediction mode is a DC mode or a planar mode, when the first flag indicates that the intra prediction mode is not an angular intra prediction mode.

Referring again to FIG. 6, filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 6 a reconstructed video block may be output by video decoder 300.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method of decoding video data, the method comprising:
   parsing a value of a bin for a flag indicating whether an intra prediction mode used for generating a prediction for a current video block is a planar mode, wherein the value of the bin for the flag is decoded by using a context value selected from a set of contexts, wherein parsing the value includes determining the context value selected based on a value of a syntax element indicating whether the current video block is partitioned into transform block subpartitions, wherein the syntax element has a value of: 0 indicating the current video block is not partitioned, or 1 indicating the current video block is partitioned, and wherein the syntax element is conditionally present in coding unit syntax based on an intra prediction reference line index; and
   determining whether the intra prediction mode used for generating the prediction for the current video block is the planar mode based on the flag.

2. A method of encoding video data, the method comprising:
   determining an intra prediction mode used for generating a prediction for a current video block is a planar mode; and
   signaling a value of a bin for a flag indicating the intra prediction mode used for generating the prediction for the current video block is the planar mode, wherein the value of the bin for the flag is encoded by using a context value selected from a set of contexts, wherein the context value is selected based on a value of a syntax element indicating whether the current video block is partitioned into transform block subpartitions, wherein the syntax element has a value of: 0 indicating the current video block is not partitioned, or 1 indicating the current video block is partitioned, and wherein the syntax element is conditionally present in coding unit syntax based on an intra prediction reference line index.

3. A device for decoding video data, the device comprising one or more processors configured to:
   parse a value of a bin for a flag indicating whether an intra prediction mode used for generating a prediction for a current video block is a planar mode, wherein the value of the bin for the flag is decoded by using a context value selected from a set of contexts, wherein parsing the value includes determining the context value selected based on a value of a syntax element indicating whether the current video block is partitioned into transform block subpartitions, wherein the syntax element has a value of: 0 indicating the current video block is not partitioned, or 1 indicating the current video block is partitioned, and wherein the syntax element is conditionally present in coding unit syntax based on an intra prediction reference line index; and
   determine whether the intra prediction mode used for generating the prediction for the current video block is the planar mode based on the flag.

\* \* \* \* \*